United States Patent
Chandramouli et al.

(10) Patent No.: US 9,965,520 B2
(45) Date of Patent: May 8, 2018

(54) EFFICIENT LOGICAL MERGING OVER PHYSICALLY DIVERGENT STREAMS

(75) Inventors: Badrish Chandramouli, Bellevue, WA (US); David E. Maier, Portland, OR (US); Jonathan D. Goldstein, Woodinville, WA (US); Peter A. Zabback, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1009 days.

(21) Appl. No.: 13/162,973

(22) Filed: Jun. 17, 2011

(65) Prior Publication Data
US 2012/0324453 A1    Dec. 20, 2012

(51) Int. Cl.
*H04J 3/04* (2006.01)
*G06F 17/30* (2006.01)
*G06F 9/46* (2006.01)
*G06F 7/00* (2006.01)

(52) U.S. Cl.
CPC .......... *G06F 17/30516* (2013.01); *G06F 7/00* (2013.01); *G06F 9/46* (2013.01)

(58) Field of Classification Search
CPC ......... G06F 17/30516; G06F 7/00; G06F 9/46
USPC ....................................................... 370/535
See application file for complete search history.

(56) References Cited

U.S. PATENT DOCUMENTS

| | | | |
|---|---|---|---|
| 5,539,749 A | 7/1996 | Eul | |
| 5,745,906 A | 4/1998 | Squibb | |
| 6,029,239 A * | 2/2000 | Brown | 712/1 |
| 7,117,278 B2 | 10/2006 | Avery | |
| 7,668,856 B2 | 2/2010 | Ganguly et al. | |
| 2003/0002474 A1* | 1/2003 | Alexander et al. | 370/351 |
| 2003/0024740 A1 | 2/2003 | Juujarvi et al. | |
| 2004/0260829 A1* | 12/2004 | Husak et al. | 709/232 |
| 2006/0268939 A1 | 11/2006 | Dries et al. | |
| 2007/0226362 A1 | 9/2007 | Johnson et al. | |
| 2008/0060034 A1 | 3/2008 | Egnal et al. | |
| 2009/0067507 A1 | 3/2009 | Baird et al. | |
| 2010/0106710 A1* | 4/2010 | Nishizawa | G06F 17/30516 707/714 |

FOREIGN PATENT DOCUMENTS

| | | |
|---|---|---|
| CN | 1611035 A | 4/2005 |
| JP | 2010108073 A | 5/2010 |
| RU | 2413277 C1 | 2/2011 |
| WO | 2010070142 A2 | 6/2010 |

OTHER PUBLICATIONS

ACM Transactions on Database Systems, vol. 29, No. 3, pp. 545-580, "Exploiting K-Constraints to Reduce Memory Overhead on Continuous Queries Over Data Streams" by Babu et al. on Sep. 2004.*

International Search Report and Written Opinion for Application No. PCT/US2012/04215, mailed on Feb. 25, 2013, 9 pages.

(Continued)

*Primary Examiner* — Ayaz Sheikh
*Assistant Examiner* — Hai-Chang Hsiung

(57) ABSTRACT

A logical merge module is described herein for producing an output stream which is logically compatible with two or more physically divergent input streams. Representative applications of the logical merge module are also set forth herein.

18 Claims, 17 Drawing Sheets

(56) References Cited

OTHER PUBLICATIONS

Hwang, et al., "Fast and Reliable Stream Processing over Wide Area Networks," Proceedings of the 2007 IEEE 23rd International Conference on Data Engineering Workshop, Apr. 2007, pp. 604-613.

Mazzucco, et al., "Merging Multiple Data Streams on Common Keys over High Performance Networks," retrieved at <<http://citeseerx.ist.psu.edu/viewdoc/download?doi=10.1.1.121.9762&rep=rep1&type=pdf>>, ACM/IEEE Conference on Supercomputing, 2002, 12 pages.

Golab, et al., "Issues in Data Stream Management," retrieved at <<http://citeseerx.ist.psu.edu/viewdoc/download?doi=10.1.1.60.7838&rep=rep1&type=pdf>>, ACM SIGMOD Record, vol., 32, Issue 2, Jun. 2003, 10 pages.

Kramer, et al., "Semantics and Implementation of Continuous Sliding Window Queries over Data Streams—Published Date," retrieved at <<http://dbs.mathematik.uni-marburg.de/teaching/seminare/09WSGProzesse/06Thema_rtm/a4-kramer.pdf>>, ACM Transactions on Database Systems, vol. 34, Issue 1, 2009, pp. 1-49.

Srivastava, et al., "Flexible Time Management in Data Stream Systems," retrieved at <<http://citeseerx.ist.psu.edu/viewdoc/download?doi=10.1.1.90.1199&rep=rep1&type=pdf>> Proceedings of the Twenty-third ACM SIGMOD-SIGACT-SIGART Symposium on Principles of Database Systems, 2004, 11 pages.

Tucker, et al., "Exploiting Punctuation Semantics in Continuous Data Streams," retrieved at <<http://ieeexplore.ieee.org/stamp/stamp.jsp?arnumber=01198390>>, IEEE Transactions on Knowledge and Data Engineering, 2004, pp. 555-568.

Li et al., "Semantics and Evaluation Techniques for Window Aggregates in Data Streams," retrieved at <<http://citeseerx.ist.psu.edu/viewdoc/download?doi=10.1.1.93.2764&rep=rep1&type=pdf >>, Proceedings of the 2005 ACM SIGMOD International Conference on Management of Data, 2005, 14 pages.

Barga, et al., "Consistent Streaming Through Time: A Vision for Event Stream Processing," retrieved at <<http://www.cidrdb.org/cidr2007/papers/cidr07p42.pdf>>, Proceedings of the Third Biennial Conference on Innovative Data Systems Research, 2007, pp. 363-374.

Maier, et al., "Semantics of Data Streams and Operators," retrieved at <<http://web.cecs.pdx.edu/~tufte/papers/StreamSemantics.pdf>>, Proceedings of ICDT, 2005, pp. 37-52.

Johnson, et al., "A Heartbeat Mechanism and Its Application in Gigascope," retrieved at <<http://citeseerx.ist.psu.edu/viewdoc/download;jsessionid=4D6A440BF6A46F82E06D62D446C7378F?doi=10.1.1.116.598&rep=repl&type=pdf>>, Proceedings of the 31st International Conference on Very Large Data Bases, 10 pages.

Li, et al., "Out-of-order Processing: A New Architecture for High-Performance Stream Systems," retrieved at <<http://web.cecs.pdx.edu/~jinli/papers/395_cameraready.pdf>>, Proceedings of the VLDB Endowment, vol. 1, Issue 1, 2008, 15 pages.

Fernandez Moctezuma, et al., "Inter-Operator Feedback in Data Stream Management Systems via Punctuation," retrieved at <<http://citeseerx.ist.psu.edu/viewdoc/download?doi=10.1.1.145.560&rep=rep1&type=pdf>>, Proceedings of the CIDR, 2009, 9 pages.

Hwang, et al., "Fast and Reliable Stream Processing over Wide Area Networks," retrieved at <<http://www.cs.brown.edu/research/db/publications/hwang.ssps07.ha.pdf>>, Proceedings of the 2007 IEEE 23rd International Conference on Data Engineering Workshop, 10 pages.

Ryvkina, et al., "Revision Processing in a Stream Processing Engine: A High-level Design," retrieved at <<http://sca2002.cs.brown.edu/research/pubs/pdfs/2006/Ryvkina-2006-RPS.pdf>>, Proceedings of the 22nd International Conference on Data Engineering, 2006, pp. 1-3.

Hammand, et al., "Nile: A Query Processing Engine for Data Streams," retrieved at <<http://citeseerx.ist.psu.edu/viewdoc/download?doi=10.1.1.85.9483&rep=rep1&type=pdf>>, Proceeding of the 20th International Conference on Data Engineering, 2004, 2004, 2 pages.

Abadi, et al., "The Design of the Borealis Stream Processing Engine," retrieved at <<http://nms.csail.mit.edu/papers/borealis-cidr05.pdf>>, Proceedings of the CIDR, 2005, 13 pages.

Babcock, et al., "Models and Issues in Data Stream Systems," retrieved at <<http://infolab.usc.edu/csci599/Fa112002/paper/DML2_streams-issues.pdf>>, Proceedings of the Twenty-first ACM SIGMOD-SIGACT-SIGART Symposium on Principles of Database Systems, 30 pages.

Xing, et al., "Dynamic Load Distribution in the Borealis Stream Processor," retrieved at http://www.cs.brown.edu/research/aurora/xing.icde05.load.pdf>>, Proceedings of the 21st International Conference on Data Engineering, 2005, 12 pages.

Hwang, et al., "High-Availability Algorithms for Distributed Stream Processing," retrieved at <<http://www.cs.brown.edu/research/aurora/hwang.icde05.ha.pdf>>, Proceedings of the 21st International Conference on Data Engineering, 2005, 12 pages.

Madden, et al., "Continuously Adaptive Continuous Queries Over Streams," retrieved at <<http://db.cs.berkeley.edu/papers/sigmod02-cacq.pdf>>, Proceedings of the 2002 ACM SIGMOD International Conference on Management of Data, 12 pages.

Botan, et al., "SECRET: A Model for Analysis of the Execution Semantics of Stream Processing Systems," retrieved at <<http://systems.ethz.pubzone.org/servlet/Attachment?attachmentId=214&versionId=1417514>>, Proceedings of the VLDB 2010, 12 pages.

Yang, et al., "HybMig: A Hybrid Approach to Dynamic Plan Migration for Continuous Queries," retrieved at <<http://ieeexplore.ieee.org/stamp/stamp.jsp?arnumber=04072750>>, IEEE Transactions on Knowledge and Data Engineering, 2007, vol. 19, No. 3, pp. 398-411.

Heinz, et al., "Toward Simulation-Based Optimization in Data Stream Management Systems," retrieved at <<http://www.mathematik.uni-marburg.de/~tobys/publications/HKRS08.pdf>>, IEEE 24th International Conference on Data Engineering, 2008, 4 pages.

Zhu, et al., "Dynamic Plan Migration for Continuous Queries Over Data Streams," retrieved at <<http://citeseerx.ist.psu.edu/viewdoc/download?doi=10.1.1.92.7648&rep=rep1&type=pdf >>, Proceedings of the 2004 ACM SIGMOD International Conference on Management of Data, 2004, pp. 431-442.

Jensen, et al., "Temporal Specialization," retrieved at <<http://www.cs.arizona.edu/~rts/pubs/ICDE92.pdf>>, Proceedings of the Eighth International Conference on Data Engineering, 1992, pp. 594-603.

Gedik, et al., "SPADE: The System S Declarative Stream Processing Engine," retrieved at <<http://www.acm.org>>, Proceedings of the 2008 ACM SIGMOD International Conference on Management of Data, 2008, pp. 1123-1134.

Hellerstein, et al., "Online aggregation," retrieved at <<http://www.acm.org>>, retrieved at <<http://www.acm.org>>, Proceedings of the 1997 ACM SIGMOD International Conference on Management of Data, 1997, pp. 171-182.

Raizman, et al., "An Extensible Test Framework for the Microsoft StreamInsight Query Processor," retrieved at <<http://research.microsoft.com/pubs/132100/Testing%20StreamInsight.pdf>>, Proceedings of the Third International Workshop on Testing Database Systems, 2010, 6 pages.

Microsoft StreamInsight home page, retrieved at <<http://msdn.microsoft.com/en-us/sqlserver/ee476990>>, Microsoft Corporation, Redmond, WA, retrieved on Jun. 16, 2011, 2 pages.

Oracle Complex Event Processing home page, retrieved at <<http://www.oracle.com/technetwork/middleware/complex-event-processing/overview/index.html>>, Oracle Corporation, Redwood Shores, CA, retrieved on Jun. 16, Oracle, 2 pages.

"Office Action Issued in European Patent Application No. 12799866.4", Mailed Date: Dec. 10, 2014, 8 Pages.

"Search Report Issued in European Patent Application No. 12799866.4", Mailed Date: Nov. 21, 2014, 2 Pages.

Kramer, et al., "A Temporal Foundation for Continuous Queries over Data Streams", Published on: Jan. 6, 2005, Available at: http://dbs.mathematik.uni-marburg.de/publications/myPapers/2005/KS05COMAD.pdf.

"First Office Action Issued in China Patent Application No. 201280029593.3", Mailed Date: Oct. 10, 2015, 13 Pages.

(56) References Cited

OTHER PUBLICATIONS

"Study and Application of Data Stream Processing System over High-speed Networks", Issue 7, Jul. 15, 2008, 15 Pages.
"Office Action Issued in Russian Patent Application No. 2013155910", Mailed Date: Jun. 1, 2016, 5 Pages.
"Second Office Action Issued in Chinese Patent Application No. 201280029593.3", Mailed Date: Jun. 21, 2016, 6 Pages.
"Office Action Issued in Japanese Patent Application No. 2014-515928", dated Aug. 2, 2016, 7 Pages.
Kashiyama, et al., "Highly Available Data Stream Management System With Distributed Object Cache", In IEICE Technical Report, vol. 110, Issue 107, Jun. 21, 2010, 10 Pages.
"Office Action Issued in Australian Patent Application No. 2012271776", dated Aug. 12, 2016, 3 Pages.
"Notice of Allowance Issued in Russian Patent Application No. 2013155910", dated Sep. 26, 2016, 10 Pages. (W/o English Translation).
"Third Office Action and Search Report Issued in Chinese Patent Application No. 201280029593.3", dated Nov. 17, 2016, 14 Pages.
"Fourth Office Action Issued in Chinese Patent Application No. 201280029593.3", dated Jun. 13, 2017, 12 Pages.

\* cited by examiner

PHYSICAL
REPRESENTATION OF
ANY INPUT STREAM

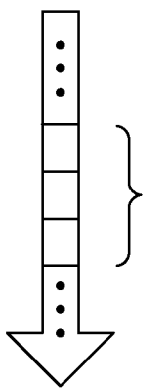

STREAM
ELEMENTS

INVOKING DIFFERENT ACTIONS,
FOR EXAMPLE:
• INSERT NEW OUTPUT INFORMATION
• ADJUST PREVIOUS OUTPUT
  INFORMATION
• OUTPUT PROGRESS MARKER
  INFORMATION

FIG. 4

PHYSICAL INPUT STREAMS

| Input 1 | Input 2 |
|---------|---------|
|         | a(A, 6, 7) |
|         | a(B, 8, 15) |
| a(B, 8, ∞) | m(A, 6, 12) |
| a(A, 6, 12) |  |
| m(B, 8, 10) | m(B, 8, 10) |
| f(11) |  |
| f(∞) | f(∞) |

↓ INCREASING
t  TIME

LOGICALLY EQUIVALENT TDB INSTANCE
FOR THE PHYSICAL INPUT STREAMS

| Payload | Interval |
|---------|----------|
| A | (6, 12) |
| B | (8, 10) |

EACH EVENT HAVING:
• A PAYLOAD (p)
• A VALIDITY INTERVAL ($V_s$, $V_e$)

FIG. 5

EXAMPLE OF THE OPERATION OF THE LOGICAL MERGE MODULE

| Input 1 | Input 2 | Output 1 | Output2 | Output 3 |
|---|---|---|---|---|
| a(A, 6, 10) | | a(A, 6, 10) | | a(A, 6, 10) |
| | a(A, 6, 12) | m(A, 6,12) | | |
| | a(B, 7, 14) | a(B, 7, 14) | | a(B, 7, 14) |
| m(A, 6, 15) | | m(A, 6, 15) | | |
| | m(A, 6, 15) | | | |
| | f(16) | f(16) | a(A, 6, 15) a(B, 7, 14) f(16) | a(A, 6, 15) f(16) |

↓ t  INCREASING TIME

FIG. 6

Algorithm 0: Logical Merge R0

```
1  MaxStable = MaxVs = -∞ ;                  }──── 1302: INITIALIZE VALUES
2  Insert(element e, stream s)        ⎫
3    if (e.Vs > MaxVs)                ⎪
4      MaxVs = e.Vs;                  ⎬──── 1304: PROPAGATE AN
5      OutputInsert(e);               ⎪      INSERT ELEMENT IF
6  Adjust(element e, stream s)        ⎭      Vs > MaxVs
7    Error("Not supported");
8  Stable(timestamp t, stream s)      ⎫
9    if (t > MaxStable)               ⎪──── 1306: PROPAGATE A STABLE
10     MaxStable = t;                 ⎬      ELEMENT IF t > MaxStable
11     OutputStable(t);               ⎭
```

FIG. 13

Algorithm 1: Logical Merge R1

```
1  MaxStable = MaxVs = - ∞ ;
2  SameVsCount[1 ... #inputs] = 0;
```
— 1402: INITIALIZE VALUES

```
3  Insert(element e, stream s)
4    if (e.Vs < MaxVs) return;
5    if (e.Vs > MaxVs)
6      SameVsCount[1 ... #inputs] = 0;
7      MaxVs = e.Vs;
8    if (MAX(SameVsCount) == SameVsCount[s])
9      OutputInsert(e);
10   SameVsCount[s]++;
11 Adjust(element e, stream s)
12   Error("Not supported");
```
— 1404: ZERO THE COUNTERS IF $V_s$ > $MaxV_s$. PROPAGATE AN ELEMENT IF THE ELEMENT PROVIDES A NEW MEMBER OF A GROUP OF DETERMINISTICALLY-ORDERED ELEMENTS THAT SHARE THE SAME $V_s$.

```
13 Stable(timestamp t, stream s)
14   if (t > MaxStable)
15     MaxStable = t;
16     OutputStable(t);
```
— 1406: PROPAGATE A STABLE ELEMENT IF t > MaxStable

FIG. 14

Algorithm 2: Logical Merge R2

1 MaxStable = MaxV$_s$ = - ∞;
2 hash = new Hashtable();
3 <u>Insert(element e, stream s)</u>
4   if (e.V$_s$ < MaxV$_s$) return;
5   if (e.V$_s$ > MaxV$_s$)
6     hash.Clear();
7     MaxV$_s$ = e.V$_s$;
8   if (!hash.Contains(e))
9     hash.Add(e);
10    OutputInsert(e);
11 <u>Adjust(element e, stream s)</u>
12   Error("Not supported");
13 <u>Stable(timestamp t, stream s)</u>
14   if (t > MaxStable)
15     MaxStable = t;
16     OutputStable(t);

1502: INITIALIZE VALUES

1506: CLEAR THE LOOKUP TABLE IF V$_s$ > MaxV$_s$.

1504: PROPAGATE AN INSERT ELEMENT IF THE LOOKUP TABLE DOES NOT CONTAIN A CORRESPONDING (PAYLOAD, V$_s$). ALSO, ADD AN ENTRY TO THE LOOKUP TABLE.

1508: PROPAGATE A STABLE ELEMENT IF t > MaxStable

FIG. 15

Algorithm 3: Logical Merge R3

```
1  MaxStable = -∞ ;
2  tree = new RedBlackTree(key: {Vs, p});
3  Insert(element e, stream s)
4    entry f = tree.SameVsPayload(e);
5    if (!exists(f))
6      if (e.Vs < MaxStable) return;
7      f = new entry;
8      f.Key = e; f.Value = new Hashtable();
9      tree.Add(f);
10     OutputInsert(e);
11   f.Value.Add(α, e.Ve); // entry for o/p
12   f.Value.Add(s, e.Ve);
13 Adjust(element e, stream s)
14   entry f = tree.SameVsPayload(e);
15   if (!exists(f)) return;
16   f.Value.Update(s, e.Ve);
17 Stable(timestamp t, stream s)
18   if (t <= MaxStable) return;
19   iterator it = tree.FindHalfFrozen(t);
20   while (entry f = it.Next())
21     InVe = f.Value.Get(s);
22     if (!exists(InVe)) InVe = f.Key.Vs;
23     OutVe = f.Value.Get(α);
24     if (InVe != OutVe and
25        (InVe < t or OutVe < t))
26       OutputAdjust(f.Key, Ve: InVe);
27       f.Value.Update(α, InVe);
28     if (InVe < t) // fully frozen
29       tree.Delete(f);
30   MaxStable = t;
31   OutputStable(t);
```

1602: INITIALIZE VALUES

1604: PROPAGATE AN INSERT ELEMENT IF THE DATA STRUCTURE LACKS AN ENTRY, EXCEPT IF $V_s$ < MaxStable. ALSO, UPDATE THE DATA STRUCTURE.

1606: IF THE DATA STRUCTURE CONTAINS AN ENTRY, UPDATE THE DATA STRUCTURE

1608: IF THE DATA STRUCTURE CONTAINS AN ENTRY, UPDATE THE DATA STRUCTURE

1610: MAKE CHANGES TO THE OUTPUT STREAM TO PREVENT FUTURE INCOMPATIBILITY BETWEEN THE INPUT STREAMS AND THE OUTPUT STREAM, AND THEN PROPAGATE A STABLE ELEMENT. THIS PROCESSING IS PREDICATED ON t > MaxStable

FIG. 16

EFFICIENT LOGICAL MERGING OVER PHYSICALLY DIVERGENT STREAMS

BACKGROUND

A data processing module (such as a data stream management system) may receive and process redundant data streams in various scenarios. For reasons set forth herein, the data processing module may confront various challenges in performing this task.

SUMMARY

Functionality is set forth herein for logically merging physically divergent input streams. In one implementation, the functionality operates by receiving the input streams from any respective sources. The functionality then uses a logical merge module to produce an output stream which is logically compatible with each of the input streams.

According to another illustrative aspect, the logical merge module represents an operator that may be applied to implement continuous queries within a data stream management system. Further, one or more instantiations of the logical merge module can be combined with other types of operators in any way.

According to another illustrative aspect, the functionality can provide different algorithms for handling different respective types of input scenarios. The different algorithms leverage different constraints that may apply to the input streams in different scenarios.

According to another illustrative aspect, the functionality can be applied in different environments to accomplish different application objectives. For example, the functionality can be used to improve the availability of an output stream, e.g., by ensuring high availability, fast availability. The functionality can also be used to facilitate the introduction and removal of data streams, e.g., by providing query jumpstart, query cutover, etc. The functionality can also provide feedback information to a source which outputs a lagging data stream, enabling that source to provide more timely results to the logical merge module.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows a physical representation of a stream.

FIG. 5 shows a logical representation of input streams in the form a temporal database (TDB) instance.

FIG. 6 shows an example in which two physically divergent input streams are transformed into a logically compatible output stream, using the logical merge module of FIG. 1.

FIGS. 13-16 show different algorithms for processing input streams using the logical merge module of FIG. 9.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a logical merge module that creates an output stream which is logically compatible with two or more physically divergent input streams. Section B describes one representative implementation of the logical merge module of Section A. That implementation can adopt an algorithm selected from a suite of possible context-specific algorithms. Section C describes representative applications of the logical merge module of Section A. And Section D describes illustrative computing functionality that can be used to implement any aspect of the features described in Sections A-C.

Figure 19:
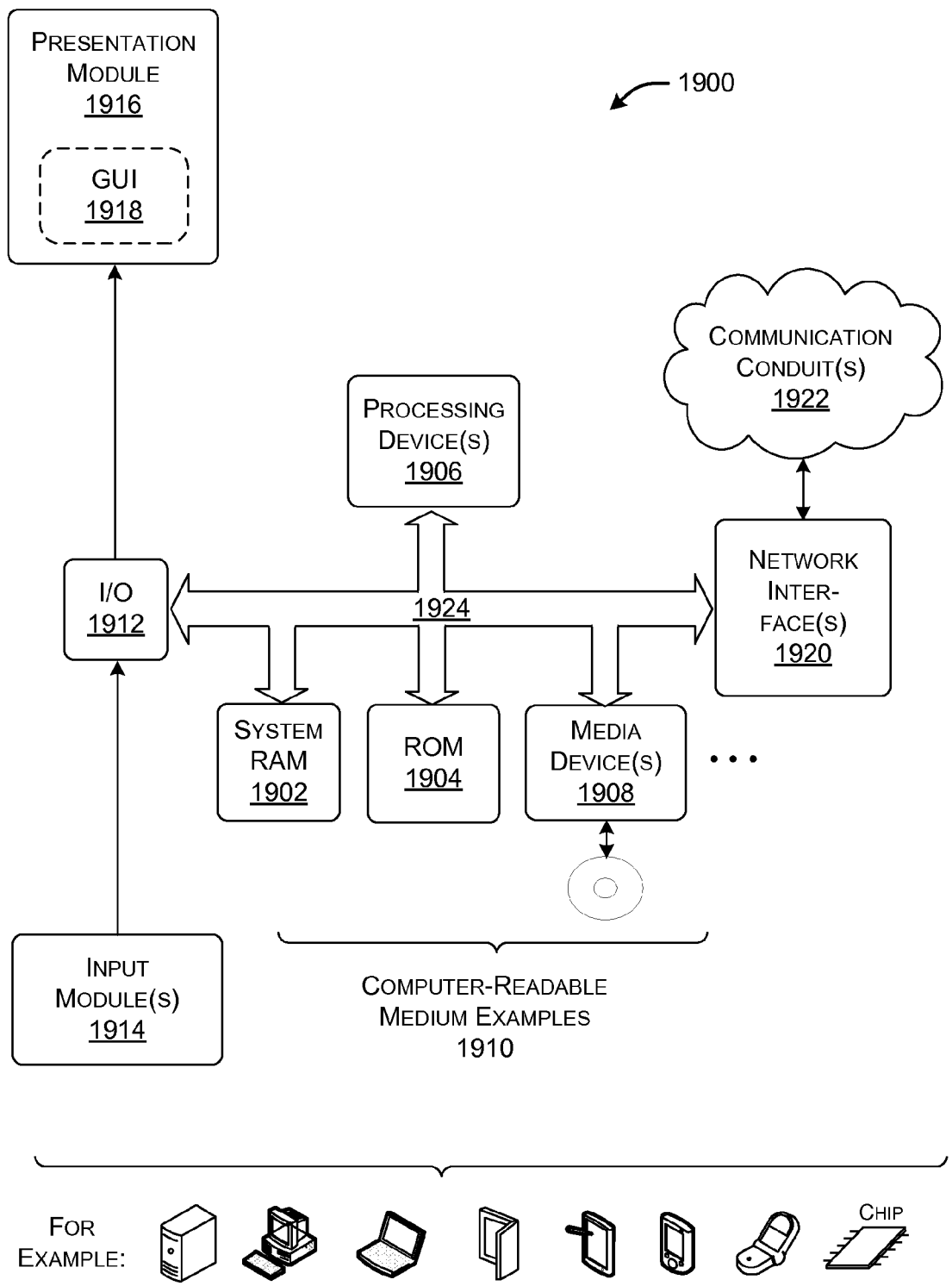
FIG. 19 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 19, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

Figure 1:
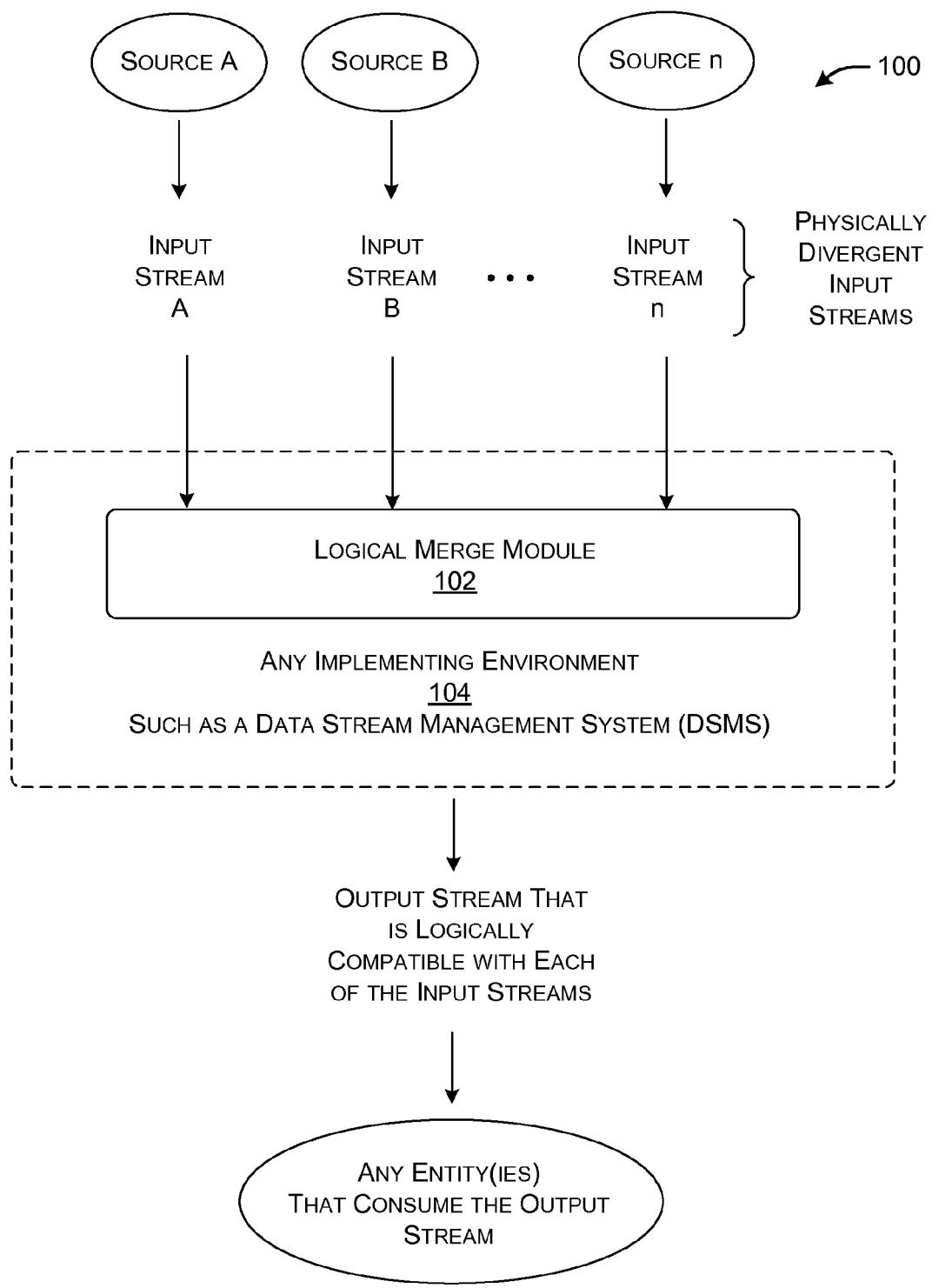
FIG. 1 shows illustrative functionality for using a logical merge module for producing an output stream which is logically compatible with physically divergent input streams.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview of the Logical Merge Module FIG. 1 shows an overview of functionality 100 for using a logical merge module 102 to create an output stream that is logically compatible with physically divergent streams (where the following explanation will clarify the concepts of "physical" and "logical," e.g., with respect to FIGS. 4 and 5). More specifically, the logical merge module 102 receives two or more digital input streams from plural respective physical sources. The input streams semantically convey the same information, but may express that information in different physical ways (for reasons to be set forth below). The logical merge module 102 dynamically generates an output stream that logically represents each of the physically divergent input streams. In other word, the output stream provides a unified way of expressing the logical essence of the input streams, in a manner that is compatible with each of the input streams. Any type of consuming entity or entities may make use of the output stream.

Any implementing environment 104 may use the logical merge module 102. In the examples most prominently featured herein, the implementing environment 104 corresponds to a data stream management system (a DSMS system). The DSMS system may apply the logical merge module 102 as at least one component in a continuous query. (By way of background, a continuous query refers to the streaming counterpart of a database query. Instead of performing a single investigation over the contents of a static database, a continuous query operates over an extended period of time to dynamically transform one or more input streams into one or more output streams.) More specifically, the DSMS system may treat the logical merge module 102 as a primitive operator. Further, the DSMS system can apply the logical merge module 102 by itself, or in combination with any other operators. However, the application of the logical merge module 102 to DSMS environments is representative, not limiting; other environments can make use of the logical merge module 102, such as various signal-processing environments, error correction environments, and so on.

Figure 2:
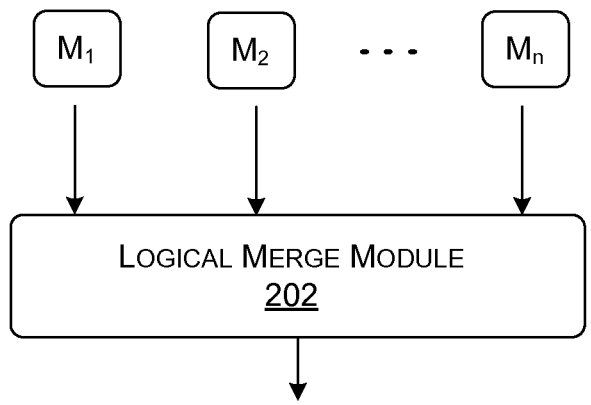
FIG. 2 shows an overview of one application of the logical merge module of FIG. 1.

FIG. 2 shows an overview of one application of a logical merge module 202. In this case, plural units ($M_1$, $M_2$, ... $M_n$) feed plural respective input streams into the logical merge module 202. For example, the units ($M_1$, $M_2$, ... $M_n$) may represent computing machines (or threads on a single machine, or virtual machine instances, etc.) that provide measurement data to the logical merge module 202 (such as, without limitation, CPU and/or memory utilization measurement data, scientific measurement data, etc.) In another case, the units ($M_1$, $M_2$, ... $M_n$) may represent different computing machines (or threads, or virtual machine instances, etc.) that implement the same query, possibly using different respective query plans. The units ($M_1$, $M_2$, ... $M_n$) can be local or remote with respect to the logical merge module 202. If remote, one or more networks (not shown) may couple the units ($M_1$, $M_2$, ... $M_n$) to the logical merge module 202.

The logical merge module 202 can generate an output stream that is logically compatible with each of the input streams. The logical merge module 202 can perform this function to satisfy one or more objectives, such as to provide high availability, fast availability, query optimization, and so on. Section C provides additional information regarding representative applications of the logical merge module 202.

Figure 3:
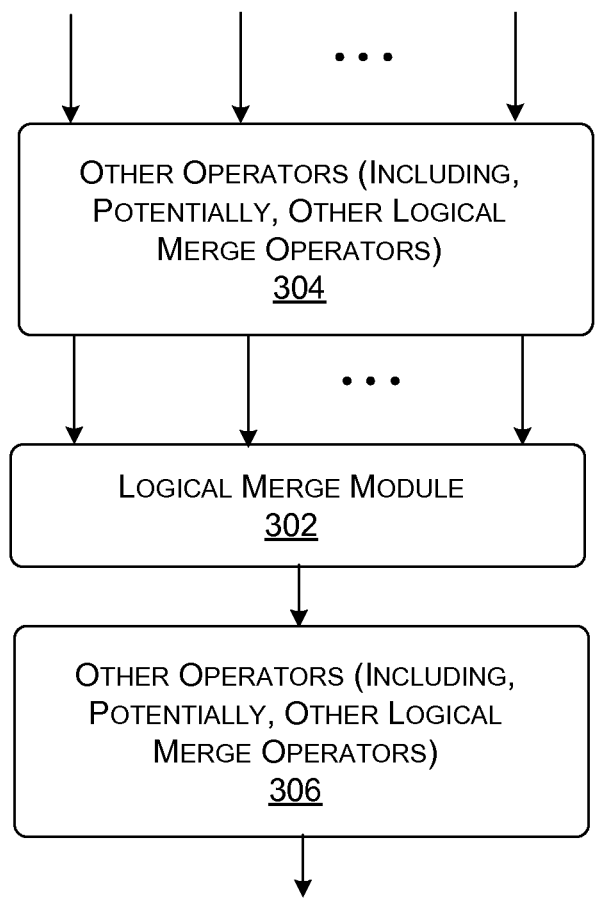
FIG. 3 shows an overview of another application of the logical merge module of FIG. 1.

FIG. 3 shows an overview of one manner in which a logical merge module 302 can be combined with other operators to implement a continuous query in a DSMS system. These operators may represent other types of operator primitives, including aggregate operators that perform an aggregation function, selector operators that perform a filtering function, sorting operators that perform a sorting operation, union operators that perform a physical union of two or more data streams, and so on. In addition, or alternatively, the logical merge module 302 can be combined with other logical merge modules.

For example, in one case, the input streams which feed into the logical merge module 302 may represent output streams generated by one or more other operators 304. In addition, or alternatively, the output stream generated by the logical merge module 302 can be fed into one or more other operators 306.

FIG. 4 shows one representation of a stream that may be fed into the logical merge module 102 of FIG. 1, or a stream that may be output by the logical merge module 102. The stream (s) includes a series of elements ($e_1$, $e_2$, ... ). These elements may provide payload information, in conjunction with instructions that govern the manner in which information extracted from the input stream is propagated to the output stream (to be set forth in detail below). A prefix S(i) of the input stream represents a portion of the input stream, e.g., $S(i) = e_1, e_2, \ldots e_i$.

A physical description of the input stream provides a literal account of its constituent elements and the arrangement of the constituent elements. Two or more input streams may semantically convey the same information, yet may have different physical representations. Different factors may contribute to such differences, some of which are summarized below.

Factors Contributing to Disorder in Streams.

A source may transmit its data stream to the logical merge module 102 over a network or other transmission medium that is subject to congestion or other transmission delays. These delays may cause the elements of the input stream to become disordered. Alternatively, or in addition, "upstream" processing modules (such as a union operator) that supply the input stream may cause the elements of the input steam to become disordered. Generally, the manner in which one input stream becomes disordered may differ from the manner in which another input stream becomes disordered, hence introducing physical differences in otherwise logically equivalent input streams.

Revisions.

Alternatively, or in addition, a source may revise its data stream in the course of transmitting its data stream. For example, a source may detect noise that has corrupted part of an input stream. In response, the source may issue a follow-up element which seeks to supply a corrected version of the part of the input stream that has been corrupted. The manner in which one source issues such revisions may differ from the manner in which another source performs this function, resulting in physical differences in otherwise logically equivalent streams.

Alternatively, or in addition, a source may revise its data stream due to a deliberate policy of pushing out incomplete information. For example, a source may correspond to a computing machine that executes an operating system process. The process has a lifetime which describes the span of time over which it operates. So as not to incur latency, the source may send an initial element which conveys the start time of the process, but not the end time (because, initially, the end time may not be known). Once the end time becomes known, the source can send an element which supplies the missing end time. The revision policy adopted by one source may differ from the revision policy of another source, resulting in differences among otherwise logically equivalent streams.

In another example, two different sources may perform an aggregation operation in different respective ways. For example, a conservative aggregation operator may wait for the entire counting process to terminate before sending a final count value. But a more aggressive aggregation operator can send one or more intermediary count values over the course of the counting operation. The end result is the same (reflecting a final count), but the streams produced by these two sources nevertheless are physically different (the second stream being more "chatty" compared to the first stream).

Different Query Plans.

Alternatively, or in addition, two different sources may use different query plans to execute a semantically equivalent processing function. The two sources produce output streams which logically represent the same outcome, but potentially in different ways. For example, a first source can perform a three-way join by combining data stream A with data stream B, and then combining the resultant intermediate result with data stream C. A second source can first combine data stream B with data stream C, and then combine the resultant intermediate result with data stream A. The stream issued by the first source may physically differ from the stream issued by the second source due to the use of different processing strategies by these sources.

Different Computing Resources.

In addition, or alternatively, two different sources may execute the same queries on different computing machines. At any given time, the first computing machine may be subject to different resource demands compared to the second computing machine, potentially resulting in the outputting of physically different streams by the two computing machines. Or the two different sources may simply have different processing capabilities (e.g., different processing and/or memory capabilities), resulting in the production of physically different streams. Other sources of non-determinism (such as the unpredictable arrival of input data) may also lead to the output of physical different output streams.

The above-described factors are cited by way of example, not limitation. Still other factors may contribute to physical differences between different input streams.

The input stream (or an output stream) can include different types of instructions associated with different types of constituent elements. In one illustrative environment, a stream includes insert elements, adjust elements, and stable elements. An insert element, insert(p, $V_s$, $V_e$), adds an event to the output stream with payload p whose lifetime is the interval ($V_s$, $V_e$). As said, $V_e$ can be left open-ended (e.g., +∞). For brevity, an insert element will sometimes be referred below as insert( ).

An adjust element, adjust(p, $V_s$, $V_{old}$, $V_e$), changes a prior-issued event (p, $V_s$, $V_{old}$) to (p, $V_s$, $V_e$). If $V_e=V_s$, the event (p, $V_s$, $V_{old}$) will be removed (e.g., canceled). For example, the sequence of elements insert(A, 6, 20)→adjust (A, 6, 20, 30)→adjust(A, 6, 30, 25) is equivalent to the single element of insert(A, 6, 25). For brevity, an adjust element will sometimes be referred to below as adjust( ).

A stable element, stable($V_c$), fixes a portion of the output stream which occurs before time $V_c$. This means that there can be no future insert(p, $V_s$, $V_e$) element with $V_s<V_c$, nor can there be an adjust element with $V_{old}<V_c$ or $V_e<V_c$. In other words, a stable($V_c$) element can be viewed as "freezing" certain parts of the output stream. An event (p, $V_s$, $V_e$) is half frozen (HF) if $V_s<V_c \le V_e$ and fully frozen (FF) if $V_e<V_c$. If (p, $V_s$, $V_e$) is fully frozen, no future adjust( ) element can alter it, and so the event will appear in all future versions of the output stream. Any output stream event that is neither half frozen nor fully frozen is said to be unfrozen (UF). For brevity, a stable element will sometimes be referred to below as stable( ).

A logical representation of a physical stream (e.g., either an input stream or an output stream) represents a logical essence of the stream. More specifically, each physical stream (and each prefix of a physical stream) corresponds to a logical temporal database (TDB) instance that captures the essence of the physical stream. The TDB instance includes a bag of events, with no temporal ordering of such events. In one implementation, each event, in turn, includes a payload and a validity interval. The payload (p) corresponds to a relational tuple which conveys data (such as measurement data, etc.). The validity interval represents the period of time over which an event is active and contributes to the output. More formally stated, the validity interval is defined with respect to a starting time ($V_s$) and an ending time ($V_e$), where the ending time can be a specific finite time or an open-ended parameter (e.g., +∞). The starting time can also be regarding as the timestamp of the event.

A mapping function translates the elements in the streams into instances (e.g., events) of a TDB instance. That is, a mapping function tdb(S, i) produces a TDB instance corresponding to the stream prefix S[i]. FIG. 5, for instance, shows an example of such a mapping of physical streams into a TDB instance. That is, a first physical stream (input 1) provides a first temporal sequence of elements, and a second physical stream (input 2) provides a second temporal sequence of events. The "a" element, a(value, start, end), is a shorthand notation for the above-described insert( ) element. That is, the "a" element adds a new event with value as payload and duration from start to end. The "m" element, m(value, start, newEnd), is a shorthand notation for the above-described adjust( ) element. That is, the "m" element modifies an existing event with a given value and start to have a new end time. An "f" element, f(time), is a shorthand notation for the above-described stable( ) element. That is, the "f" element finalizes (e.g., freezes from further modifications) every event whose current end is earlier than time. As can be seen, the first physical stream and the second physical stream are physically different because they have a different series of elements. But these two input streams accomplish the same goal and are thus semantically (logically) equivalent. The right portion of FIG. 5 shows a two-event TDB instance that logically describes both of the input streams. For example, the first event in the TDB instance indicates that the payload A exists (or contributes to the stream) for a validity interval which runs from time instance 6 to time instance 12, which is a logical conclusion that is compatible with the series of elements in both physical streams. As new physical elements arrive, the corresponding logical TDB may evolve accordingly (e.g., turning into a different bag of events every time an element is added). Note that the prefixes of any two physical streams may not always be logically equivalent, but they are compatible in that they can still become equivalent in the future.

Given the above clarification of the concepts of "physical" and "logical," the operation and properties of the logical merge module 102 can now be expressed more precisely. The logical merge module 102 treats the physical input streams as being logically equivalent, which means that the streams have logical TDB representations that will eventually be the same. The logical merge module 102 produces an output stream that is logically equivalent to its input streams, meaning that the output stream has a TDB representation that will eventually be the same as that of the input streams.

More formally stated, stream prefixes $\{I_1[k_1], \ldots, I_n[k_n]\}$ are considered mutually consistent if there exists finite sequences $E_i$ and $F_i$, $1 \leq i \leq n$ such that $E_1:I_1[k_1]:F_1 \equiv \ldots \equiv E_i:I_i[k_i]:F_i \equiv \ldots \equiv E_n:I_n[k_n]:F_n$ (where the notation A:B represents the concatenation of A and B). The input streams $\{I_1, \ldots, I_n\}$ are mutually consistent if all finite prefixes of them are mutually consistent. The output stream prefix O[j] is considered compatible with an input stream prefix I[k] if, for an extension I[k]: E of the input prefix, there exists an extension O[j]:F of the output sequence that is equivalent to it. Stream prefix O[j] is compatible with the mutually consistent set of input stream prefixes $I=\{I_1[k_1], \ldots, I_n[k_n]\}$ if, for any set of extensions $E_1, \ldots, E_n$ that makes $I_1[k_1]$: $E_1, \ldots, I_n[k_n]E_n$ equivalent, there is an extension O[j]:F of the output sequence that is equivalent to them all.

FIG. 6 shows an example of the operation of the logical merge module 102 of FIG. 1. In this case, two input streams (input 1 and input 2) can be mapped into a first output stream (output 1), or a second output stream (output 2), or a third output stream (output 3). The output streams are physical streams that are all logically equivalent to the two input streams (meaning that they have the same TDB as the input streams). But the output streams produce this equivalence in different physical ways. More specifically, the first output stream (output 1) represents an aggressive output policy because it propagates every change from the input streams that it encounters. The second output stream (output 2) represents a conservative policy because it delays outputting elements until it receives assurance that the elements are final. Hence, the second output stream produces fewer elements than the first output stream, but it produces them at a later time than the first output stream. The third output stream (output 3) represents an intermediary policy between the first output steam and the second output stream. That is, the third output stream outputs the first element it encounters with a given payload and start, but saves any modifications until it is confirmed that they are final.

The particular policy adopted by an environment may represent a tradeoff between competing considerations. For example, an environment may wish to throttle back on the "chattiness" of an output stream by reporting fewer changes. But this decision may increase the latency at which the environment provides results to its consumers.

Figure 7:
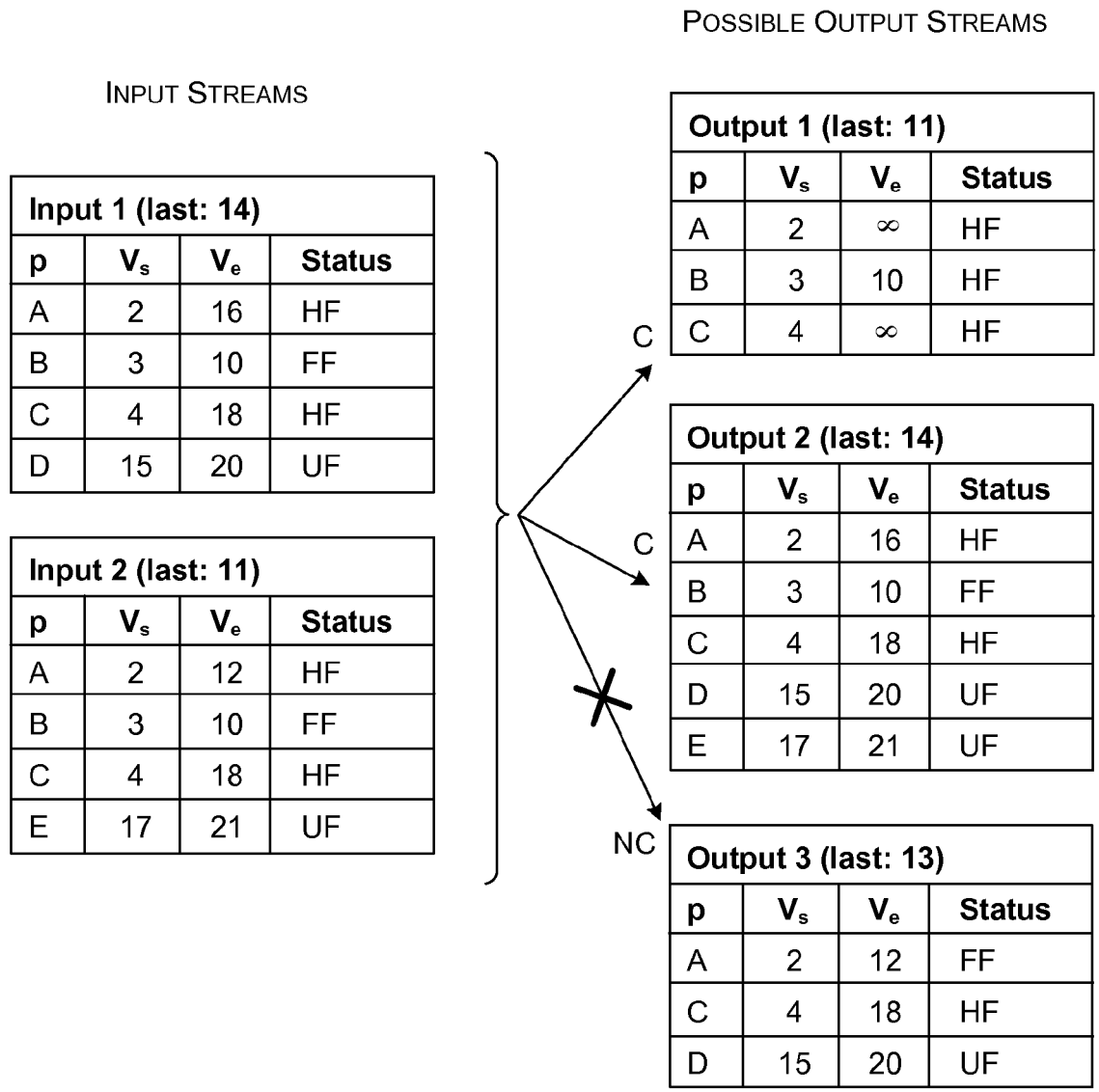
FIG. 7 shows an example in which two physically divergent input streams are transformed into three alternative output streams; the output streams have different respective levels of "chattiness."

FIG. 7 shows another example of the operation of the logical merge module 102 of FIG. 2. In this case, the logical merge module 102 maps two input streams (input 1, input 2) into three possible output streams, where, in this case, both input and output streams are described by their TDBs. For each of the TDBs, the "last" parameter in this example refers to the latest value V that has been encountered in a stable(V) element. The right-most column represents the freeze status of each element, e.g., UF for unfrozen, HF for half frozen, and FF for fully frozen.

The first output stream (output 1) and the second output stream (output 2) are both considered to be logically compatible with the two input streams. More specifically, the first output stream represents the application of a conservative propagation policy that outputs only information that will necessarily appear in the output. As such, it will be appropriate to adjust the end times of the first output stream. The second output stream represents the application of a more aggressive policy because it contains events corresponding to all input events that have been seen, even if those events are unfrozen. As such, the second output stream will need to issue later elements to completely remove some events in the output stream.

In contrast, the third output stream is not compatible with the two input streams, for two reasons. First, although the event (A, 2, 12) matches an event in the second input stream, it contradicts the contents of the first input stream (which specifies that the end time will be no less than 14). Because this event is fully frozen in the third output stream, there is no subsequent stream element that can correct it. Second, the third output stream lacks the event (B, 3, 10), which is fully frozen in the input streams but cannot be added to the third output stream given its stable point.

FIG. 7 therefore generally highlights one of the challenges faced by the logical merge module 102. The logical merge module 102 is tasked with ensuring that, at any given point in time, the output stream is able to follow future additions to the input streams. The manner in which this goal is achieved will depend on multiple considerations, including, for instance, the types of elements that are being used within the input streams, other constraints (if any) which apply to the input streams, etc.

Figure 8:
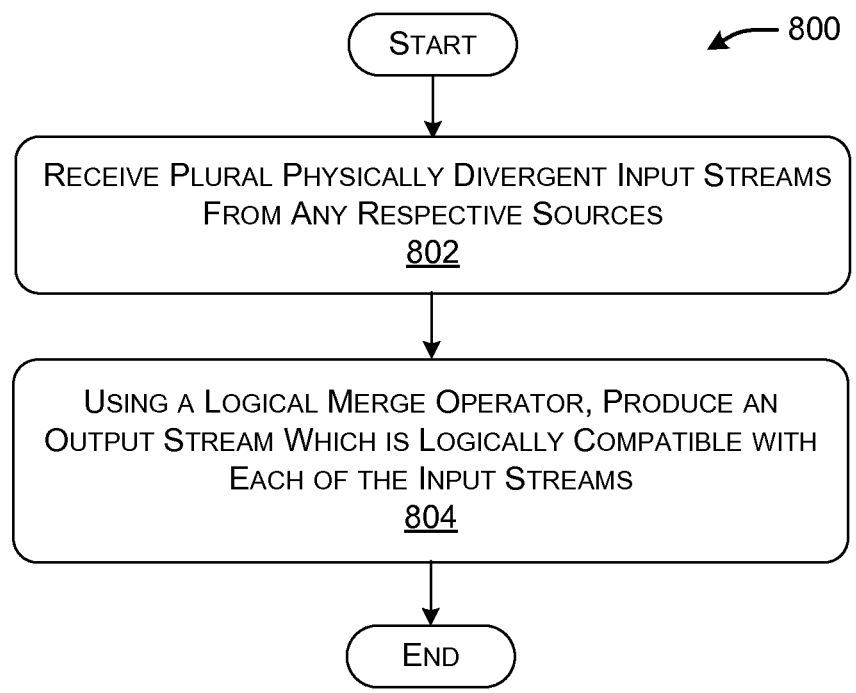
FIG. 8 is a procedure that sets forth an overview of one manner of operation of the logical merge module of FIG. 1.

FIG. 8 shows a procedure 900 which summarizes the above-described operation of the logical merge module 102. In block 902, the logical merge module 102 receives plural physically divergent input streams from any respective sources. As explained above, the sources may correspond to entities which supply raw data (such as raw measurement data). Alternatively, or in addition, the sources may correspond to one or more operators which perform processing and provide resultant output streams. In block 904, the logical merge module produces an output stream which is logically compatible with each of the input streams. As described above, this means that the output stream has a TDB representation that will eventually be the same as the TDB representations of the input streams.

B. Illustrative Implementation of the Logical Merge Module

Figure 9:
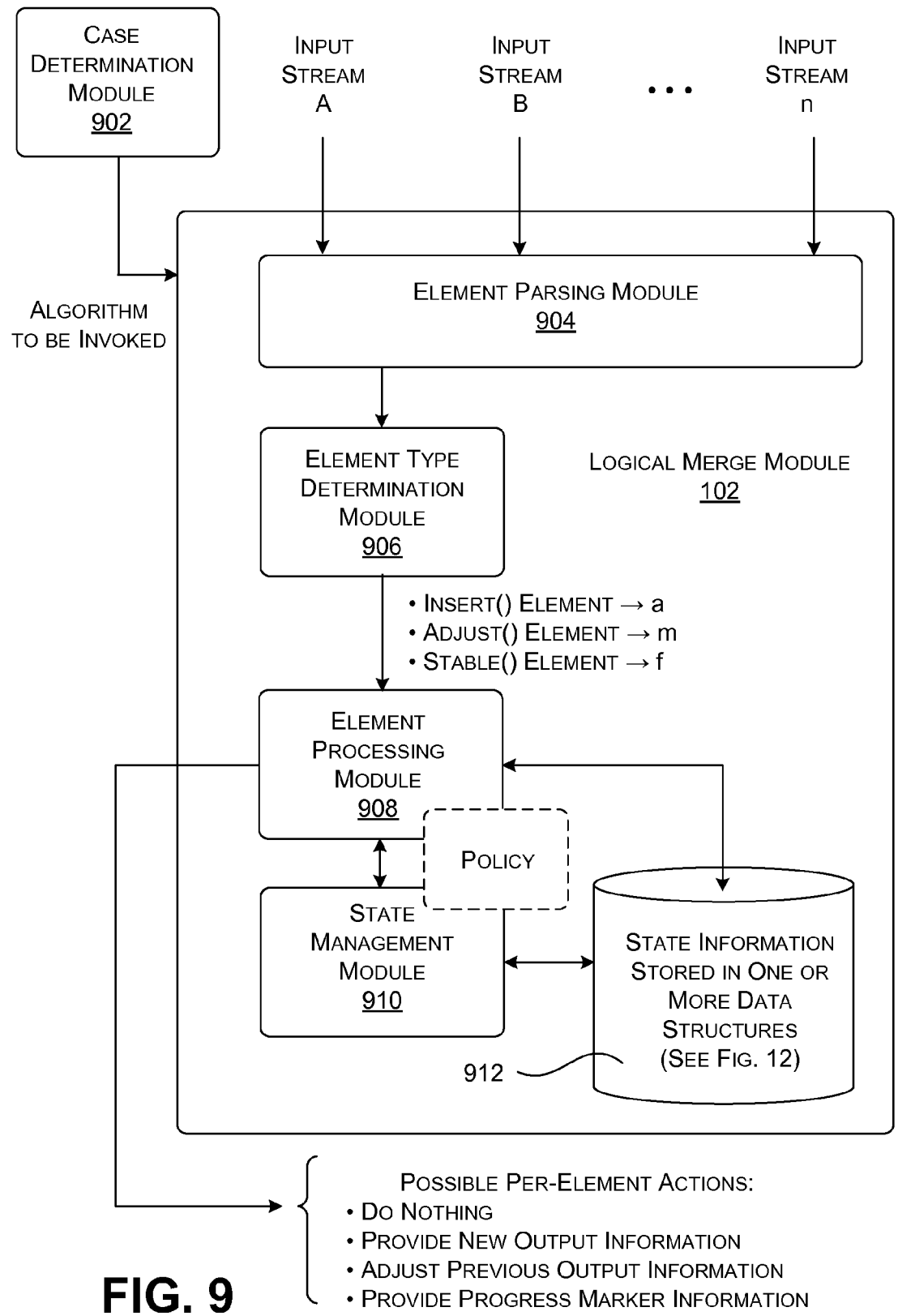
FIG. 9 shows one implementation of the logical merge module of FIG. 1.

FIG. 9 shows one implementation of the logical merge module 102 of FIG. 1. The logical merge module 102 shown in FIG. 9 implements an algorithm selected from a suite of possible algorithms. Each algorithm, in turn, is configured to handle a collection of input streams that are subject to a class of constraints. Hence, this section will begin with a description of illustrative classes of constraints that may affect a collection of input streams. In one case, it is assumed that all of the members of a collection of input streams are subject to the same class of constraints. However, other implementations can relax this characteristic to varying extents.

In a first case (case R0), the input streams contain only insert( ) and stable( ) elements. In other words, the input streams lack the ability to modify prior elements in the input stream. Further, the $V_s$ times in the elements are strictly increasing. Hence, the stream exhibits a deterministic order with no duplicate timestamps. A number of simplifying assumptions can be drawn regarding a stream that is subject to the R0-type constraints. For example, once time has advanced to point t, the logical merge module 102 can safely assume that it has seen all payloads with $V_s \leq t$.

In a second case (case R1), the input streams again contain only insert( ) and stable( ) elements. Further, the $V_s$ times are non-decreasing. Further, there can now be multiple elements with equal $V_s$ times, but the order among elements with equal $V_s$ times is deterministic. For example, the elements with equal $V_s$ times may be sorted based on ID information within the payload p.

In a third case (case R2), the input streams again contain only insert( ) and stable( ) elements. However, in this case, the order for elements with the same $V_s$ time can differ across input streams. Further, for any stream prefix S[i], the combination of payload (p) and the $V_s$ time forms a key for locating a corresponding event in the TDB representation of the output stream. More formally stated, the combination (p, $V_s$) forms a key for tdb(S, i). For example, such a property might arise if p includes ID information and a reading, where no source provides more than one reading per time period. As will be described below, this constraint facilitates matching up corresponding events across input streams.

In a fourth case (case R3), the input streams may now contain all types of elements, including adjust( ) elements. Further, this case places no constraints on the order of elements, except with respect to stable( ) elements. Similar to case R2, for any stream prefix S[i], the combination (p, $V_s$) forms a key for locating a corresponding element in the output stream. More formally stated, the combination (p, $V_s$) forms a key for tdb(S, i).

In a fifth case (case R4), the input streams may possess all the freedoms of the fourth case. In addition, in this case, the TDB is a multi-set, which means that there can be more than one event with the same payload and lifetime.

These stream classes are representative, rather than limiting. Other environments can categorize the properties of sets of input streams in different ways, depending on the nature of the input streams.

A case determination module 902 represents functionality that analyzes a collection of input streams and determines its characteristics, with the objective of determining what constraints may apply to the collection of input streams. The case determination module 902 can make this determination in different ways. In one case, the case determination module 902 relies on information extracted during a preliminary analysis of a processing environment in which the logical merge module 102 is used, e.g., by examining the characteristics of the functionality which generates the input streams. This preliminary analysis can be performed at compile time, or at any other preliminary juncture. For example, consider a first example in which the processing environment includes a reordering or cleansing operator that accepts disordered input streams, buffers these streams, and outputs time-ordered streams to the logical merge module 102. The case determination module 902 can assume that the input steams include time-ordered $V_s$ times in this circumstance (e.g., due to presence of the above-described type of reordering or cleansing operator). Case R0 applies to these input streams.

In another case, the processing environment may employ a multi-valued operator that outputs elements to the logical merge module 102 having duplicate timestamps, where those elements are ranked in a deterministic manner (e.g., based on sensor ID information, etc.). Case R1 applies to these input streams. In another case, the processing environment may employ an operator that outputs elements to the logical merge module 102 with duplicate timestamps, but those elements have no deterministic order. Case R2 applies to these input streams.

In addition, or alternatively, the case determination module 902 can perform runtime analysis on the characteristics of the collection of input streams. Alternatively, or in addition, the sources which supply the input streams can annotate the input streams with information which reveals their characteristics. For example, each input stream can publish information that indicates whether the stream is ordered, has adjust( ) elements, has duplicate timestamps, etc.

Based on the determination of the application case (R0, R1, etc.), the logical merge module 102 can select a corresponding algorithm to process the collection of input streams. Namely, for case R0, the logical merge module 102 selects an R0 algorithm; for case R1, the logical merge module 102 selects an R1 algorithm, and so on. Choosing a context-specific algorithm to handle a constrained set of input streams may be advantageous to improve the performance of the logical merge module 102, as such an algorithm can leverage built-in assumptions associated with the applicable case. Alternatively, the logical merge module 102 can take a conservative approach and use a more general-purpose algorithm, such as the algorithm for case R3, to process collections of input streams having varying levels of constraints (e.g., sets of input streams subject to the constraints of R0, R1, R2, or R3).

The logical merge module 102 itself can include (or can be conceptualized as including) a collection of modules which perform respective functions. To begin with, an element parsing module 904 identifies individual elements within the input streams. The logical merge module 102 then performs per-element processing on each element in the input streams as the elements are received. The logical merge module 102 can also perform processing on groups of elements in parallel to expedite processing.

An element type determination module 906 identifies the type of each element. In one illustrative implement, one element type is the above-described insert( ) element; this element provides an instruction to propagate new output information, e.g., by commencing a new validity interval at timestamp $V_s$. Another element type is the above-described adjust( ) element; this element adjusts information imparted by a previous element, e.g., by supplying a new V, for a previous element. Another element type is the above-described stable( ) element; this element provides progress marker information which marks a time before which no further changes can be made to the output stream (e.g., using an insert( ) element or an adjust( ) element).

An element processing module 908 determines, for each element, whether or not to propagate an event to the output stream. For example, for an insert( ) element, the element processing module 908 can determine whether it is appropriate to add an insert event to the output stream. For an adjust( ) element, the element processing module 908 can determine whether it is appropriate to add an adjust element to the output stream. And for a stable( ) element, the element processing module 908 can determine whether it is appropriate to add a stable element to the output stream. Further, for some algorithms, certain elements that appear in the input streams may prompt the element processing module 908 to make other adjustments to the output stream. For example, for the case of the R3 and R4 algorithms (to be described below), the element processing module 908 can propagate adjust elements to the output stream in certain circumstances, upon receiving a stable( ) element in the input streams; this operation is performed to ensure logical compatibility between the input streams and the output stream.

More generally, the element processing module 908 attempts to create an output stream that expresses the logical essence of each of the input streams, e.g., by producing an output stream having a TDB instance that matches the TDB instances of the input streams (where the TDB instances of the input streams are considered equivalent). The element processing module 908 dynamically performs this analysis on the basis of the stream elements that have been received up to any given point in time. This analysis contends with a host of complexities, including: hard constraints, e.g., when an element specifies a finite $V_e$; open-ended constraints, e.g., when an element specifies an open-ended $V_e$; and closure-related constraints, e.g., when a stable( ) element renders a portion of the output stream immutable to further changes before an identified time $V_c$. These complexities present two general challenges. First, the element processing module 908 is asked to form an output stream that does not directly contradict any of the constraints that have already been imposed by the collection of input streams, e.g., where such contradiction is manifest, not hypothetical. Second, at any given instance, the element processing module 908 is asked to perform "what if" analysis, that is, by forming an output stream that takes into account stream elements that could conceivably be received in the future, in view of the constraints (and freedoms) associated with stream elements that have been received so far. (This because the general aim of the logical merge module 102 is to produce an output stream having a TDB instance that will eventually become equivalent to the TDB instances of the input streams.)

Figure 12:
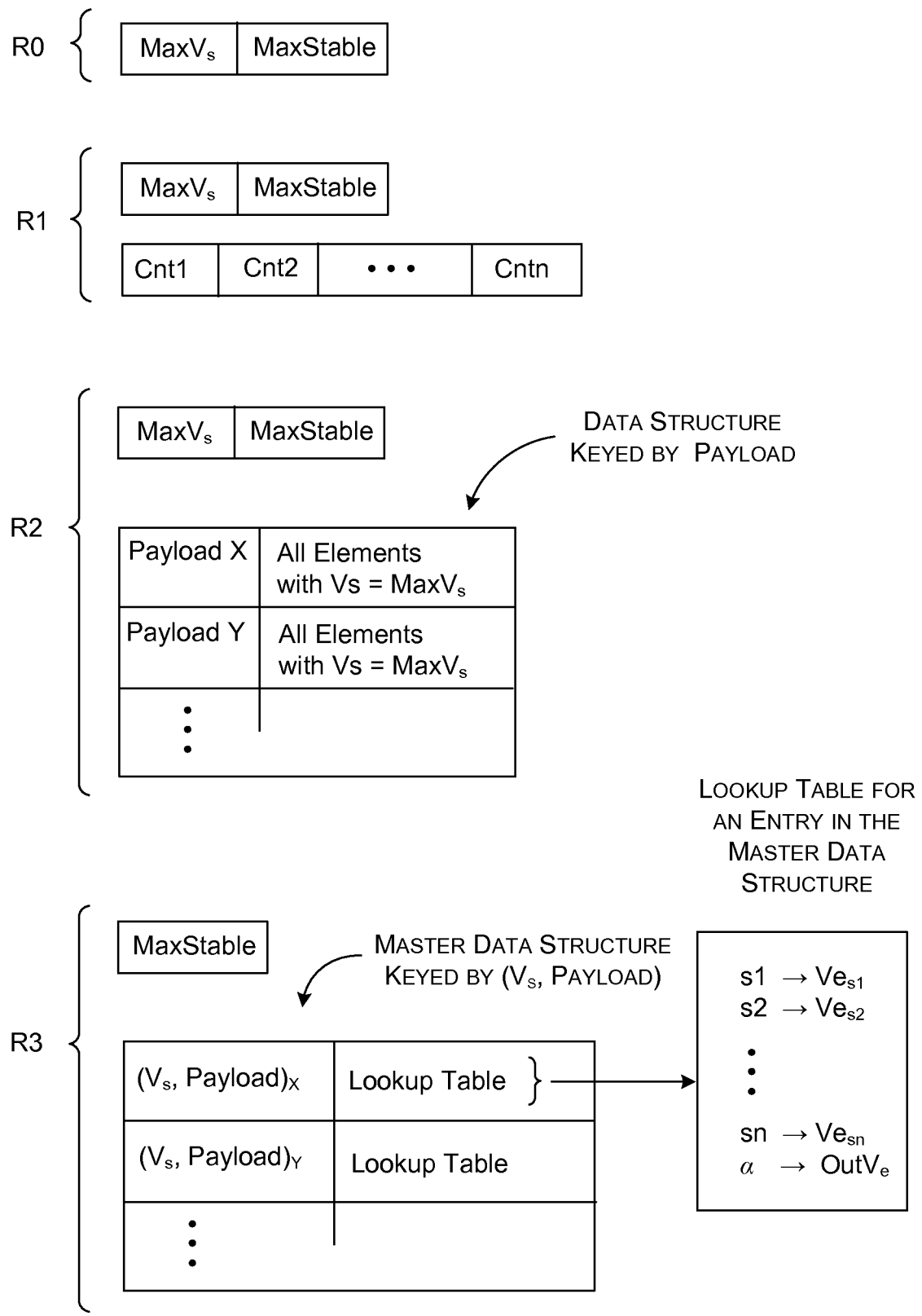
FIG. 12 shows different data structures that can be used to maintain state information by plural respective algorithms.

A state management module 910 stores state information in one or more data structures within a data store 912. The state information captures information pertaining to the input streams, and, in some cases, information that has been propagated to the output steam. More specifically, different algorithms maintain different types of state information, depending on the constraints which apply to the input streams. For example, FIG. 12 summarizes the data structures that may be used by the algorithms R0, R1, R2, and R3. As can be seen, as constraints are removed from the input stream, the state management module 910 increases the amount of state information that it stores. The data structures shown in FIG. 12 will be described in greater detail in the context of the explanation of the algorithms for cases R0-R4.

Figure 10:
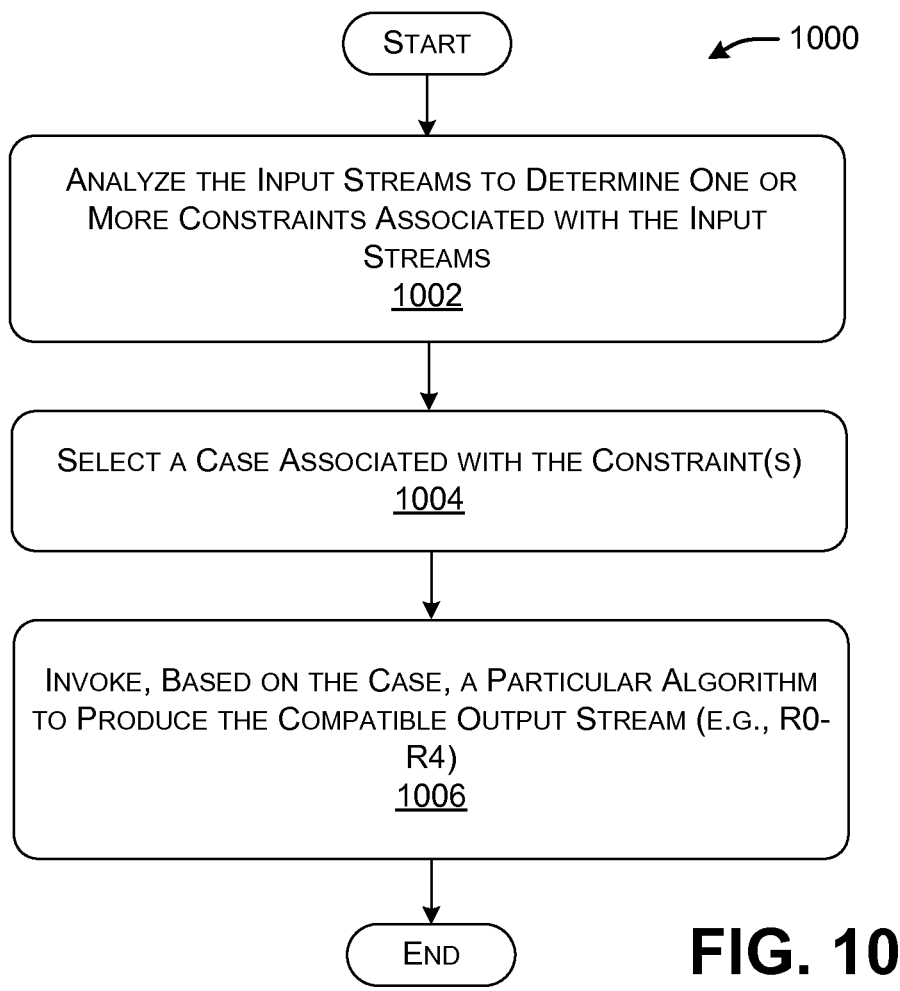
FIG. 10 is a procedure for selecting an algorithm (for use by the logical merge module of FIG. 9), based on the characteristics of a set of input streams.

FIG. 10 shows a procedure 1000 which summarizes the above-described operation of the case determination module 902. In block 1002, the case determination module 902 analyzes the input streams to determine their characteristics, and, in particular, to determine whether one or more constraints apply to the input streams. In block 1004, the case determination module 902 selects a case associated with the constraints assessed in block 1202. In block 1006, the case determination module 902 instructs the logical merge module 102 to invoke a particular algorithm to handle the case determined in block 1004.

Figure 11:
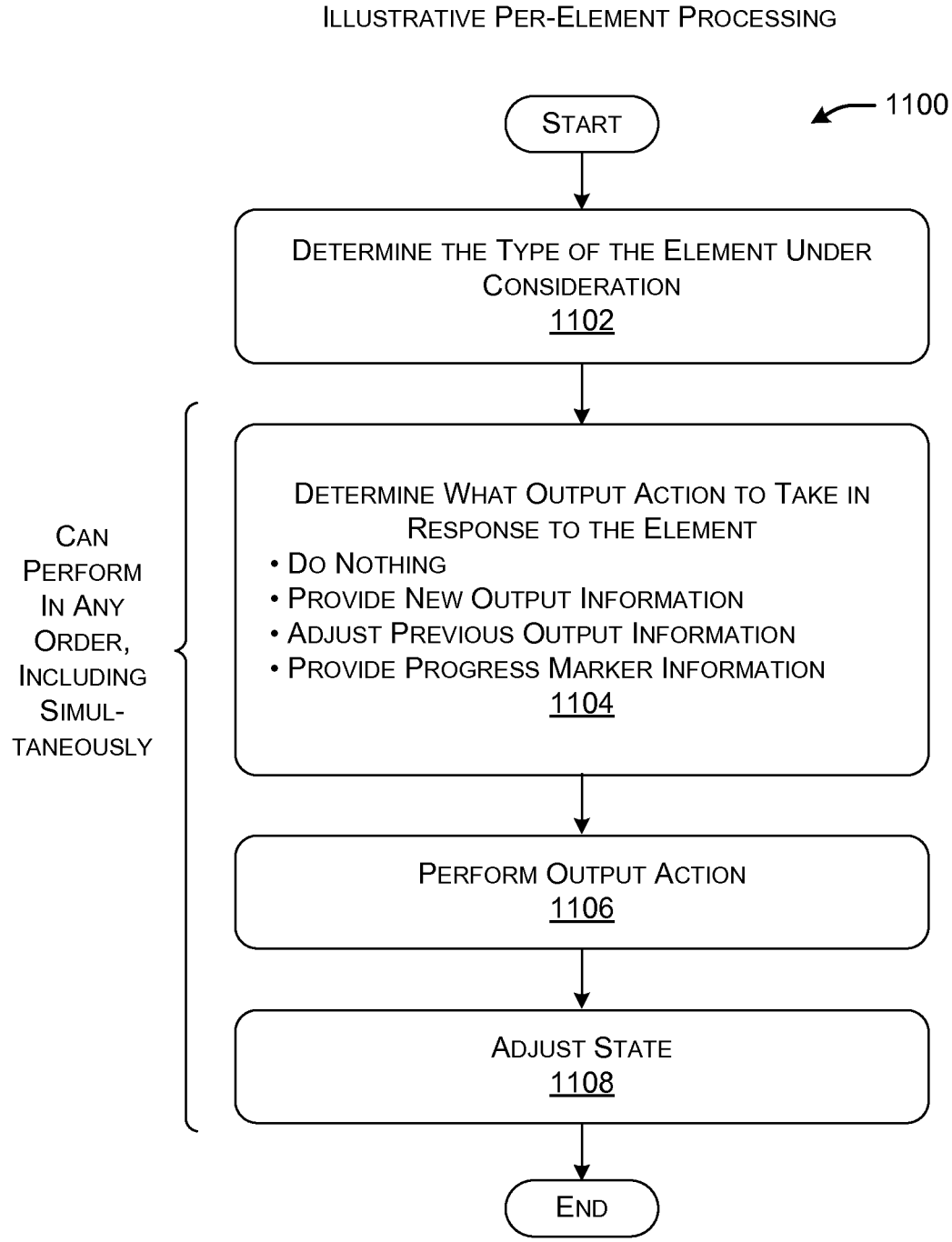
FIG. 11 is a procedure for processing elements within input streams using the logical merge module of FIG. 9.

FIG. 11 shows a procedure 1100 which summarizes the operation of the logical merge module 102 set forth in FIG. 9, with respect to a particular element. In block 1102, the logical merge module 102 determines the type of the element under consideration (e.g., an insert( ) element, an adjust( ) element, or a stable( ) element). In block 1104, the logical merge module 102 determines what type of element(s) is to be propagated to the output stream in response to the element under consideration. For example, the logical merge module 102 may: (a) refrain from propagating any information to the output stream; (b) propagate new output information, e.g., using an insert( ) element; (c) adjust previous output information, e.g., using an adjust( ) element; or (d) provide progress marker information (which partially or fully freezes some events in the output stream), e.g., using a stable( ) element.

FIGS. 13-16 describe illustrative algorithms for respectively handling cases R0, R1, R2, and R4. These figures will be explained with reference to the corresponding data structures shown in FIG. 12. Further, these algorithms are described with respect to the processing of two input steams; but the algorithms can be applied to the scenario in which there are more than two input streams.

Logical Merge Algorithm for Case R0

For the case of R0, the input streams have elements with strictly increasing $V_s$ values, without adjust( ) elements. Hence, there are no duplicate timestamps. In this case, the state management module 910 maintains only two pieces of information. First, the state management module 910 stores the maximum $V_s$ (MaxV$_s$) that has been encountered in the input streams. Second, the state management module 910 stores the maximum stable timestamp (MaxStable) seen across all input streams.

FIG. 13 shows an algorithm for handling the R0 case. In step 1302, the logical merge module 102 initializes the values of MaxV$_s$ and MaxStable.

In step 1304, the logical merge module 102 processes an insert( ) element, if, in fact, the element under consideration is an insert( ) element. That is, the logical merge module 102 propagates the insert( ) element to the output stream if the $V_s$ of this element is larger than the prevailing MaxV$_s$. Further, the logical merge module 102 updates the MaxV$_s$ value to correspond to the $V_s$ value of the element. Otherwise (if $V_s$ is not larger than MaxV$_s$), the logical merge module 102 does not propagate this element to the output stream. Note that the symbol "s" denotes an identifier (e.g., an integer) that corresponds to a particular input stream.

In step 1306, the logical merge module 102 handles a stable( ) element, if, in fact, the element under consideration is a stable( ) element. That is, the logical merge module 102 outputs a stable( ) element if its time stamp t (also referred to as $V_c$ in the examples above) is larger than MaxStable.

Logical Merge Algorithm for Case R1

For the case of R1, the input streams have elements with non-decreasing $V_s$ values, without adjust( ) elements. Here, the input streams may have duplicate $V_s$ timestamps, but such elements are presented in deterministic order (e.g., sorted on a field in the payload). In this case, the state management module 910 maintains the MaxV$_s$ and MaxStable values as before (for case R0). In addition, the state management module 910 maintains an array with a counter value for each input stream. The counter value for a particular input stream reflects a number of elements on that stream in which $V_s$=MaxV$_s$.

FIG. 14 shows an algorithm for handling the R1 case. In step 1402, the logical merge module 102 initializes the values of MaxV$_s$ and MaxStable. The logical merge module 102 also initializes the values of the array of counters.

In step 1404, the logical merge module 102 processes an insert( ) element, if, in fact, the element under consideration is an insert( ) element. That is, the logical merge module 102 resets the array of counter values to zero if the $V_s$ value of the insert( ) element is larger than the current value of MaxV$_s$, and then sets MaxV$_s$ equal to $V_s$. In line 8, the logical merge module 102 determines whether the insert( ) element on stream s increases the counter for s beyond a maximum counter value across all streams; if so, the logical merge module 102 propagates the insert( ) element to the output stream. In other words, the logical merge module 102 outputs the insert element if the insert element represents a new member of a deterministically ordered group of possible elements which share the same $V_s$. For example, assume that each stream includes three insert( ) elements for each $V_s$ (e.g., corresponding to three different sensor IDs), presented in a fixed order. Further assume that, at a particular point in analysis, a second insert element has been received on a particular stream s. The logical merge module 102 will output this insert( ) element if no other stream has already received its respective second element for this $V_s$.

In step 1406, the logical merge module 102 handles a stable( ) element, if, in fact, the element under consideration is a stable( ) element. The logical merge module 102 handles the stable( ) element in the same manner as algorithm R0.

Logical Merge Algorithm for Case R2

For the case of R2, the input streams have elements with non-decreasing $V_s$ values, with no adjust( ) elements. Further, the input streams may have duplicate $V_s$ timestamps; and, for this case, such elements need not be presented in a deterministic order. In this case, the state management module 910 maintains the MaxV$_s$ and MaxStable values as before. In addition, the state management module 910 maintains a lookup table having payload (p) as a key. Each entry in the table, for a particular payload key (p), stores elements with $V_s$=MaxV$_s$. See FIG. 12 for an illustration of this data structure.

FIG. 15 shows an algorithm for handling the R2 case. In step 1502, the logical merge module 102 initializes the values of MaxV$_s$ and MaxStable. The logical merge module 102 also creates the lookup table.

In step 1504, the logical merge module 102 begins processing an insert( ) element, if, in fact, the element under consideration is an insert( ) element. That is, the logical merge module 102 first consults the lookup table (using the payload p specified in the element as a key). If the table indicates that the particular combination of payload and $V_s$ already exists (because it has been received from some other stream), the logical merge module 102 performs no further action. Otherwise, the logical merge module 102 updates the lookup table and outputs the insert element.

In block 1506, the logical merge module 102 clears the lookup table if it encounters an element that increases $V_s$ beyond MaxV$_s$. The logical merge module 102 also updates the value to MaxV$_s$ to correspond to $V_s$.

In step 1508, the logical merge module 102 handles a stable( ) element, if, in fact, the element under consideration is a stable( ) element. The logical merge module 102 handles the stable( ) element in the same manner as before.

Logical Merge Algorithm for Case R3

For the case of R3, the elements within the input streams can now include any type of elements, including insert( ) elements, adjust( ) elements, and stable( ) elements. Further, the elements can be presented in any temporal order. As a remaining constraint, the algorithm for R3 assumes that the combination of $V_s$ and payload (p) may serve as a key to determine a corresponding entry in the output stream. More specifically, as shown in FIG. 12, the state management module 910 can maintain a master data structure that indexes entries by the key ($V_s$, Payload). Each entry consists of an event (e) (e.g., $V_s$ and Payload) and a small lookup table that contains, for each input stream s, the current $V_e$ value for that stream, indexed by key s. The lookup table also contains an entry (OutV$_e$) with a key α that provides an output $V_e$ (associated with an output event that has been propagated to the output stream).

FIG. 16 shows an algorithm for handling the R3 case. In step 1602, the logical merge module 102 initializes the values of MaxV$_s$ and MaxStable. The logical merge module 102 also creates a master data structure. In one case, the logical merge module 102 can create a red-black tree to implement the master data structure.

In step 1604, the logical merge module 102 begins processing an insert( ) element, if, in fact, the element under consideration is an insert( ) element. That is, the logical merge module 102 performs a lookup in the master data structure to find an entry with the same ($V_s$, Payload) associated with the insert( ) element under consideration. If such an entry does not exist in the master data structure, the logical merge module 102 adds the entry and produces an output. In the lookup table associated with the entry ($V_s$, Payload), the logical merge module 102 adds a $V_e$ entry for stream s as well as for the output that has been propagated to the output stream. However, the logical merge module 102 does not perform this updating operation if $V_s$ is determined to be less than MaxStable (as assessed in line 6); this indicates that the corresponding entry previously existed in the master data structure but has since been removed.

In block 1606, if an entry already exists in the master data structure for the particular key (payload, $V_s$), then the logical merge module 102 updates the lookup table for this entry in an appropriate manner.

In block 1608, the logical merge module 102 processes an adjust( ) element, if, in fact, the element under consideration is an adjust( ) element. That is, if an entry already exists in the master data structure for a particular key (payload, $V_s$) specified in the adjust( ) element, then the logical merge module 102 updates the lookup table for this entry. According to one policy choice, block 1608 does not involve propagating any adjust( ) elements in any circumstance.

In block 1610, the logical merge module 102 processes a stable( ) element, if, in fact, the element under consideration is a stable( ) element. As indicated in line 18, the logical merge module 102 returns without performing any action unless the timestamp t is larger than MaxStable. If this condition is met, the logical merge module 102 first finds entries in the master data structure that will become half frozen as a result of the propagation of the stable( ) element.

That is, these are entries having $V_s$ values less than the timestamp of the stable( ) element. For each such entry, the logical merge module 102 determines instances in which there is a mismatch between the input and the output, where a compatibility violation will occur if the stable( ) element e is propagated to the output stream.

More specifically, in one implementation, the logical merge module 102 considers three circumstances in which compatibility violations will occur. In a first case, there is no input event for ($V_s$, Payload) in stream s, but there is an output event (due to the contribution of some other input stream). In a second case, the currently output event will become fully frozen due to the propagation of the stable( ) element e, but the corresponding input is not fully frozen. In a third case, the input event will become fully frozen, but the current output is not fully frozen. In all of these cases, according to one possible policy, the logical merge module 102 adjusts the output so that it matches the input (which occurs in lines 24-27). It performs this operation by propagating appropriate adjust( ) elements to the output stream and updating the master data structure accordingly.

Further, in lines 28-29, if the input becomes fully frozen, the logical merge module 102 can delete the corresponding entry from the master data structure. Finally, in lines 30-31, the logical merge module updates the value of MaxStable and outputs the stable( ) element.

In summary, block 1610 involves modifying the output stream to ensure that the propagation of the stable( ) element under consideration will not cause future logical incompatibilities between input streams and the output stream. The logical merge module 102 can then safely output the stable( ) element.

Logical Merge Algorithm for Case R4

The data streams for the case of R4 have all the same freedoms of case R3. But now multiple elements in a data stream can have the same ($V_s$, Payload), with different $V_e$ values. Further, an input stream can include duplicate entries. To address this situation, the master data structure for case of R3 can be modified to account for the presence of different $V_e$ values. Consider a lookup table associated with a particular (payload, $V_s$) entry in the master data structure. The single value of $V_e$ for an entry (as provided in the R3 case) is now replaced with a small $V_e$ data structure that is indexed based on the unique $V_e$ values that have been encountered, along with a count, for that ($V_s$, Payload) combination in that input steam.

As in the case of the R3 algorithm, the R4 algorithm may modify the output stream (using adjust elements) prior to outputting a stable( ) element, to thereby avoid future incompatibility between the input streams and the output stream. But the logical merge module 102 now bases its modifications on more complex considerations.

For example, according to a first consideration, the logical merge module 102 attempts to ensure that the output stream contains no more events for a particular ($V_s$, Payload) than the maximum number of events in any input stream, for that ($V_s$, Payload). This condition may be desirable to limit output chattiness, although it is not mandatory.

According to a second consideration, when an incoming stable( ) element has a timestamp greater than some $V_s$ (such that that $V_s$ becomes half frozen), the logical merge module 102 attempts to ensure that, for each ($V_s$, Payload) combination in the input that is getting half frozen, there are exactly as many output events with a value of ($V_s$, Payload) as there are in the input. To perform this task, the logical merge module 102 may produce new output elements or "cancel" prior output elements for that ($V_s$, Payload) combination.

According to a third consideration, for a particular ($V_s$, Payload), if some $V_e$ becomes fully frozen as a result of an incoming stable( ) element, the logical merge module 102 attempts to ensure that the output stream contains the same number of events with that ($V_s$, Payload, $V_e$), before propagating the stable( ) element. If the corresponding $V_s$ was already half frozen, this process simply involves adjusting the $V_e$ of events output earlier with the same ($V_s$, Payload).

According to a fourth consideration, when the stable( ) timestamp moves beyond the largest $V_e$ in the $V_e$ data structure, for a particular ($V_s$, Payload), the logical merge module 102 can delete the corresponding ($V_s$, Payload) entry from the data structure.

As noted above, the logical merge module 102 may, in certain circumstances, defer to a policy in determining what action to take in propagating elements to the output stream. Different environments can adopt different policies based on different respective considerations. As set forth above, many policies adopt a particular tradeoff between chattiness (the amount of information propagated in the output stream) and latency (the timeliness at which information in the input streams is propagated to the output stream). To produce low latency, a policy may opt to propagate elements as soon as they are received, even if they contain incomplete information or may need to be revised later. To reduce chattiness, a policy may wish to throttle back on the propagation of elements to varying extents.

For example, consider the policy adopted by the logical merge module 102 when processing adjust( ) elements in the R3 algorithm (e.g., in step 1608). The logical merge module 102 is configured to never output adjust( ) events. The logical merge module 102 ensures that the output stream is compatible with the input streams only when it process a stable( ) element.

But this policy can be modified in various ways. In another case, the logical merge module 102 can reflect every adjust( ) element in the output stream. This choice produces a more "chatty" output stream compared to the policy described above. But it also allows downstream consumers to accept and process such changes earlier if they so choose. In another option, the logical merge module 102 can "follow" a particular input stream, for example, the stream with the current maximum stable( ) timestamp (referred to as the leading stream). This choice simplifies the algorithm, and may be appropriate when one input stream tends to be ahead of the others. However, if the leading stream changes frequently, this policy can incur significant overhead in re-adjusting output.

Next consider the processing that the logical merge module 102 performs within the R3 algorithm at line 10. At this juncture, when processing the first insert( ) element for a particular V, the logical merge module 102 immediately propagates it to the output stream. This policy ensures that the output is maximally responsive. But this policy can be modified in various ways to suit other policy objectives.

For example, in another case, the logical merge module 102 can output an insert( ) element only if it is produced by the input stream with the maximum stable( ) timestamp, or having the maximum number of unfrozen elements. In another case, the logical merge module 102 can avoid sending an element as output until it becomes half frozen on some input stream. This policy ensures that the logical merge module 102 never fully removes an element that is placed on the output, at the expense of higher latency. In another case, the logical merge module 102 can adopt a hybrid choice by waiting until some fraction of the input streams have produced an element for each $V_s$, before sending the element to the output. If input streams are physically different, this policy may reduce the probability of producing spurious output that later needs to be fully deleted.

As a final topic in this section, note that the algorithms described above are resilient to missing elements in the input streams, e.g., caused by corruption of the input streams or any other phenomenon. For example, the algorithms for cases R0, R1, and R2 can output elements that are missing in some stream s as long as some other stream delivers the missing elements to the logical merge module 102 before the stream s delivers an element with higher $V_s$. The algorithms for cases R3 and R4 output an element e as long as the stream that increases MaxStable beyond $V_s$ (for that element) produces the element e.

C. Illustrative Applications of the Logical Merge Module

As noted in Section A, different environments can use the logical merge module 102 for different applications. This section sets forth a non-exhaustive collection of illustrative applications.

Figure 17:
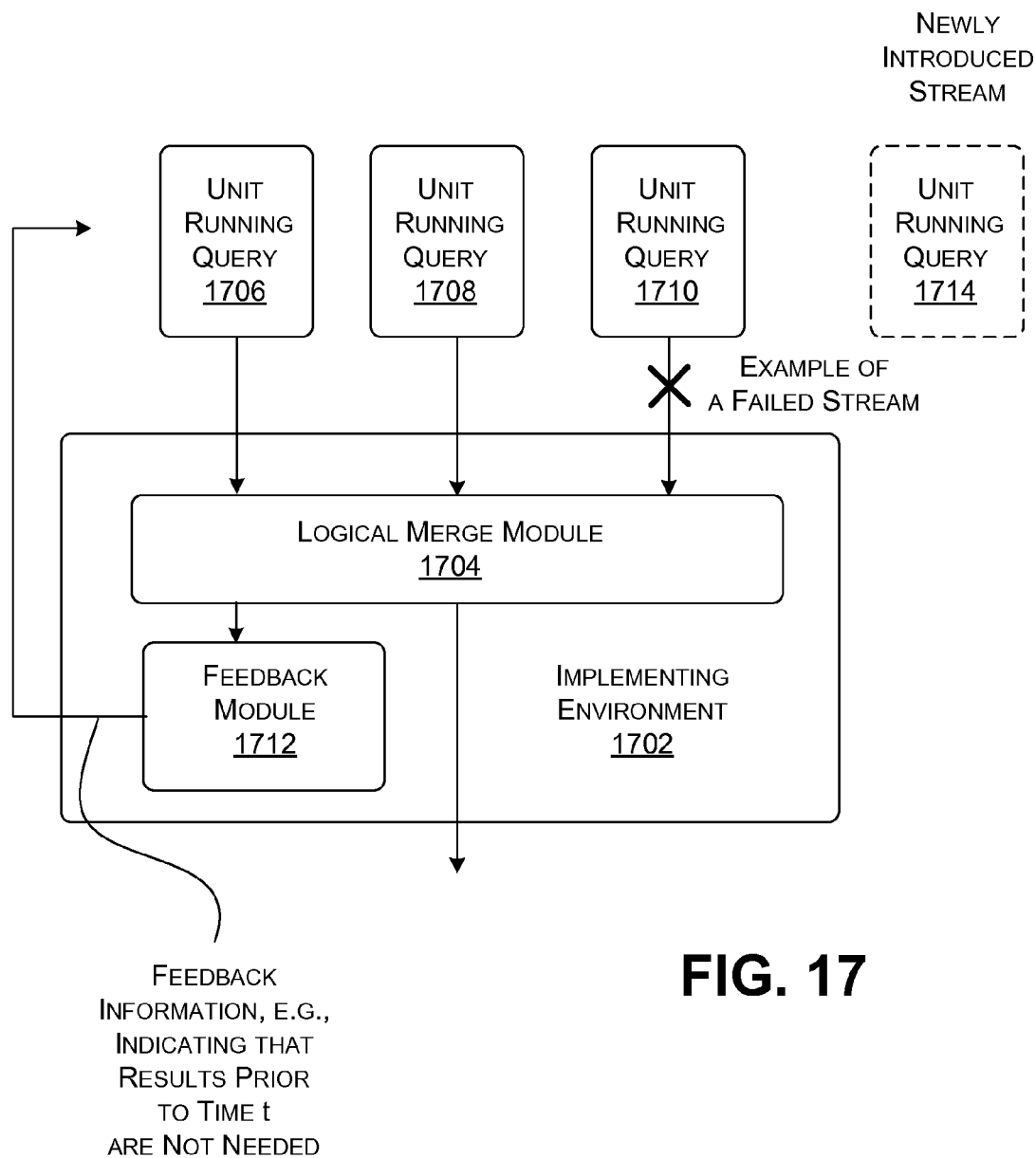
FIG. 17 shows functionality that incorporates a logical merge module, serving as a vehicle for explaining various applications of the logical merge module.

Consider FIG. 17. Here, a host environment 1702 of any type includes one or more logical merge modules, referred to for ease of reference as a singular logical merge module 1704. The logical merge module 1704 receives plural input streams from plural respective units (e.g., units 1706, 1708, and 1710). In one case, the units (1706, 1708, 1710) may correspond to computing machines (or separate processes within a single machine). The logical merge module 1704 then produces an output stream which is logically compatible with each of the input streams.

High Availability.

In a first application, the environment 1702 may use the logical merge module 1704 to ensure high availability. Consider, for example, the case in which a continuous query relies on a long processing window to produce an output stream. It therefore will take a correspondingly long time to restart such a continuous query upon its failure. To address this issue, the environment 1702 can install redundant copies of the continuous query on the different units (1706, 1708, 1710), each of which provides an input stream to the logical merge module 1704. The environment 1702 can then apply the logical merge module 1704 to pull results from whichever input stream has not failed at a particular moment in time, accommodating the case where up to n−1 of n input streams have failed. Further, the environment 1702 can use the logical merge module 1704 to incorporate a new input stream once a continuous query has properly "spun up" after being restarted or newly introduced (in a manner described below).

In another application, the units (1706, 1708, 1710) may represent machines that are remotely located from the environment 1702, delivering their streams via a network of any type (such as the Internet). In that case, the environment 1702 can rely on the logical merge module 1704 to reduce the effects of network congestion, which may cause delays or other degradation in one or more input steams. As in the above case, the logical merge module 1704 can perform this task by selectively pulling elements from one or more input streams that exhibit satisfactory performance.

Fast Availability.

In another application, the environment 1702 may use the logical merge module 1704 to ensure fast availability, that is, by enabling a consumer to obtain output results as soon as possible. To achieve this objective, the environment 1702 can install different (but semantically-equivalent) query plans on the units (1706, 1708, 1710). The environment 1702 can then use the logical merge module 1704 to pull results from whatever unit (or units) that are providing the timeliest results at any particular time. Different query plans may exhibit more satisfactory performance than other query plans for myriad environment-specific reasons. For example, a particular query plan may be better suited for processing a particular type of dataset compared to another query plan. Alternatively, or in addition, a unit which runs a particular query plan may provide better performance than other units, e.g., due to resource contention issues and/or other processing delays that affect the units in different ways.

Note that an environment that attempts to satisfy one availability criterion (e.g., high availability) may also satisfy another availability criterion (e.g., fast availability). The strategy described above for fast availability can also be used for query optimization, that is, by selecting a query plan, at any given instance, that yields the most desirable results in view of one or more performance objectives.

Plan Fast-Forward.

Various factors may cause one query plan to lag behind the other query plans. If this happens, the environment 1702 cannot make effective use of the output stream generated by this lagging query plan, rendering its work effectively wasted. To address this situation, the environment 1702 can include a feedback module 1712 which helps bring the lagging query plan up-to-date with respect to the other query plans. In operation, the logical merge module 1704 can notify the feedback module 1712 that one or more output streams are not providing results that are useful, e.g., because they lag behind the results of other streams and therefore are providing stale information that has already been supplied by the other streams. In response, the feedback module 1712 can send feedback information to the unit(s) that are executing the substandard-performing plan(s). In one case, the feedback information can inform the unit(s) that operations prior to a designated time t are not needed by the logical merge module 1704. In addition, or alternatively, the feedback module 1712 can convey information regarding the state of more satisfactorily-performing plans. Upon receipt of the feedback information, the units can perform various forms of corrective actions, such as purging useless (stale) state information, incorporating more timely state information, abandoning useless processing operations, jumping ahead to more current processing operations, and so on.

More generally, the manner in which an "upstream" operator chooses to react to the feedback information may depend on the nature of the particular function it performs. In one implementation, any operator which receives feedback information can, in turn, propagate feedback information to one or more operators further upstream in the query processing flow.

Query Jumpstart.

In another application, the environment 1702 may use the logical merge module 102 to facilitate the introduction of a new continuous query which produces a new input stream. For example, in FIG. 17, assume that a new unit 1714 is introduced to run a new instance of a continuous query. As stated above, some continuous queries operate by accumulating state information over a relatively long period of time before they can produce viable results for consumption. To address this issue, the environment 1702 can "seed" the query state of the newly introduced continuous query, e.g., based on checkpoint information stored on disk or provided by another running copy of the query. The environment 1702 can then apply the logical merge module 1704 to seamlessly merge the newly introduced stream with other ongoing streams, making the output of the newly introduced stream available for consumption as soon as possible.

Query Cutover.

In another application, the environment 1702 can apply the logical merge module 1704 to efficiently "cut over" from one query instance to a newly instantiated query instance (representing the same query plan or a different query plan). The environment 1702 can perform this task to facilitate query optimization. For example, a cloud-computing environment may employ such a cutover mechanism to migrate executing queries based on workload conditions.

More generally, various applications set forth above involve the introduction or removal of streams. The logical merge module 1704 can include appropriate mechanism to facilitate these tasks. For example, when a stream is removed as an input to the logical merge module 1704, the logical merge module can mark the stream as having left. The algorithms described above (for cases R0-R4) will eventually no longer consider the stream that has been removed.

For joining, a joining stream provides a timestamp t such that it is guaranteed to produce viable output for every point starting from t (that is, every event in the output with $V_e \geq t$). The logical merge module 1704 can mark the stream as "joined" as soon as MaxStable reaches t, since, from this point forwards, the logical merge module 1704 can tolerate the simultaneous failure or removal of all the other streams.

Figure 18:
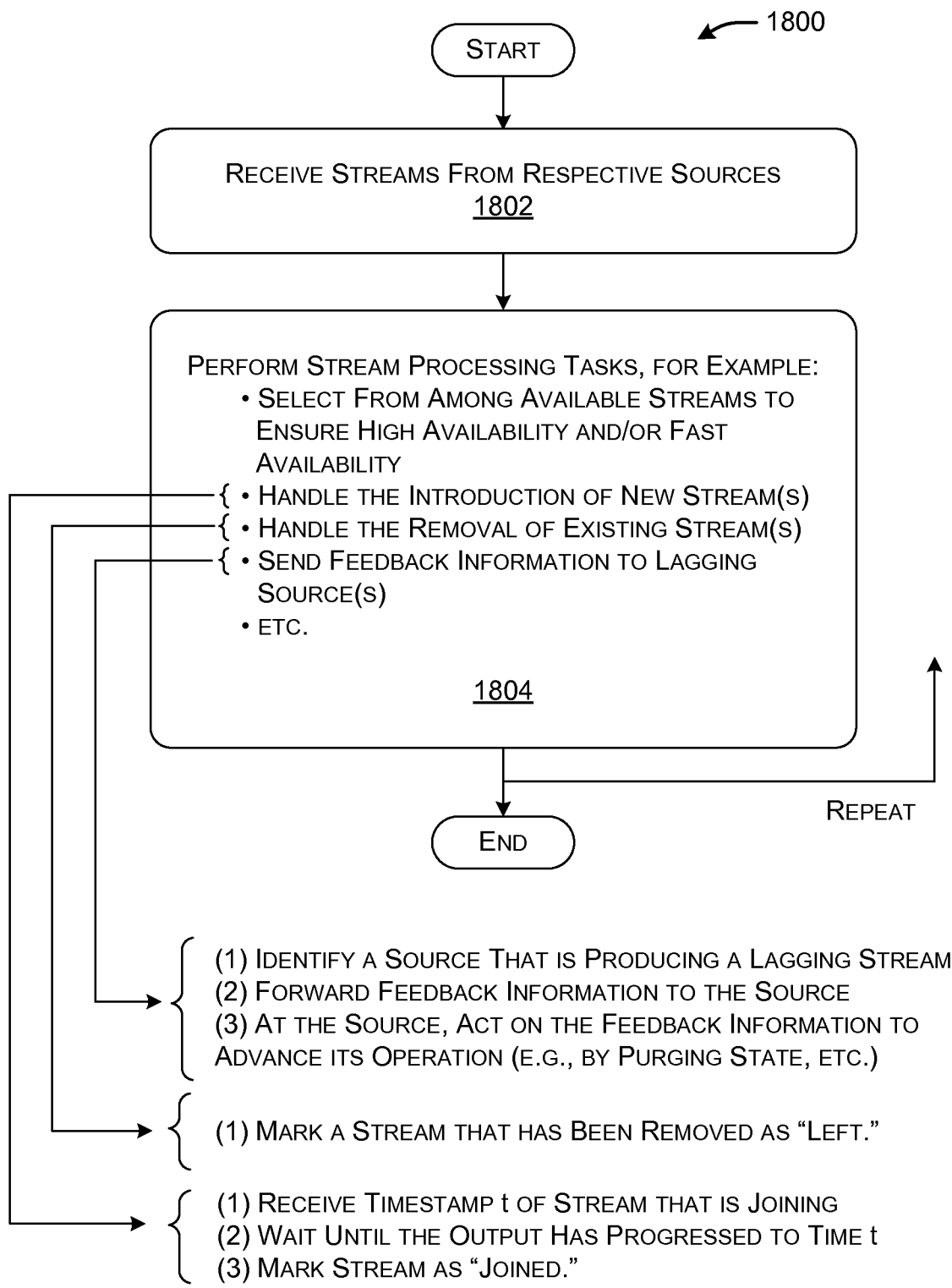
FIG. 18 is a procedure that sets forth various applications of the logical merge module of FIG. 17.

FIG. 18 shows a procedure 1800 which summarizes selected applications described above. In block 1802, the logical merge module 1704 receives two or more streams from any respective sources. In block 1804, the logical merge module 1704 performs one or more application-specific operations on the input streams. Such applications can include selecting from among the input streams to ensure high availability and/or fast availability, facilitating the introduction or removal of streams, notifying the feedback module 1712 of the presence of a substandard-performing stream (upon which the feedback module 1712 can send feedback information to the appropriate source), and so on.

D. Representative Computing functionality

FIG. 19 sets forth illustrative computing functionality 1900 that can be used to implement any aspect of the functions described above. For example, the computing functionality 1900 can be used to implement any aspect of the logical merge module 102 of FIG. 1. In one case, the computing functionality 1900 may correspond to any type of computing device that includes one or more processing devices. The computing device may optionally be a member of a cluster of such computing devices.

The computing functionality 1900 can include volatile and non-volatile memory, such as RAM 1902 and ROM 1904, as well as one or more processing devices 1906 (e.g., one or more CPUs, and/or one or more GPUs, etc.). The computing functionality 1900 also optionally includes various media devices 1908, such as a hard disk module, an optical disk module, and so forth. The computing functionality 1900 can perform various operations identified above when the processing device(s) 1906 executes instructions that are maintained by memory (e.g., RAM 1902, ROM 1904, or elsewhere).

More generally, instructions and other information can be stored on any computer readable medium 1910, including, but not limited to, static memory storage devices, magnetic storage devices, optical storage devices, and so on. The term computer readable medium also encompasses plural storage devices. In all cases, the computer readable medium 1910 represents some form of physical and tangible entity.

The computing functionality 1900 also includes an input/output module 1912 for receiving various inputs (via input modules 1914), and for providing various outputs (via output modules). One particular output mechanism may include a presentation module 1916 and an associated graphical user interface (GUI) 1918. The computing functionality 1900 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area network, a wide area network (e.g., the Internet), etc., or any combination thereof. The communication conduit(s) 1922 can include any combination of hardwired links, wireless links, routers, gateway functionality, name servers, etc., governed by any protocol or combination of protocols.

Alternatively, or in addition, any of the functions described in Sections A-C can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by physical and tangible computing functionality, for merging streams of data, comprising:
   receiving a plurality of physically divergent input streams from respective sources;
   parsing and identifying elements in the plurality of input streams;
   determining an output action to take in response to each identified element;
   using a logical merge module to produce an output stream that is logically compatible with each of the input streams,
   wherein the output action is selected from among:
      providing no contribution to the output stream;
      providing new output information to the output stream;
      adjusting previous output information in the output stream; and
      providing progress marker information to the output stream; and
   adjusting a state associated with the logical merge module, wherein the logical merge module applies an algorithm selected from a plurality of algorithms for performing said adjusting and determining, the plurality of algorithms associated with varying respective levels of constraints associated with the plurality of input streams.

2. The method of claim 1, wherein a data stream management system performs said receiving and said using to implement a continuous query.

3. The method of claim 2, wherein the logical merge module represents an operator that is combinable with one or more other operators.

4. The method of claim 1, further comprising:
analyzing the input streams to determine one or more constraints associated with the input streams;
selecting a case associated with said one or more constraints; and
invoking, based on the case, a particular algorithm to produce the output stream, using the logical merge module.

5. The method of claim 1, wherein the logical merge module applies a policy, selected from among a plurality of possible policies, for performing said determining and adjusting.

6. The method of claim 1, wherein the input streams originate from plural respective units, wherein the units implement a same continuous query.

7. The method of claim 6, wherein the plural respective units execute the continuous query using different respective query plans.

8. The method of claim 6, further comprising sending feedback information to at least one of the plural units to enable said at least one of the plural units to advance its operation.

9. The method of claim 1, wherein the output stream is produced by the logical merge module by selecting from at least one non-failed input stream at any given time, to provide high availability.

10. The method of claim 1, wherein the output stream is produced by the logical merge module by selecting from at least one timely input stream at any given time, to provide fast availability.

11. The method of claim 1, further comprising using the logical merge module to accelerate introduction of a new source which produces a new input stream.

12. The method of claim 1, further comprising using the logical merge module to transition from one input stream to another input stream.

13. A logical merge module, implemented by physical and tangible computing functionality, for processing streams, comprising:
an element parsing module for parsing elements in plural physically divergent input streams, wherein the input streams originate from plural respective units, the units implementing a same continuous query;
an element type determining module for assessing a type of each element identified by the element parsing module;
an element processing module for determining an output action to take in response to each element that has been identified, to produce an output stream that is logically compatible with each of the plural input streams, the output action selected from among:
providing no contribution to the output stream;
providing new output information to the output stream;
adjusting previous output information in the output stream; and
providing progress marker information to the output stream; and
a state management module for adjusting a state associated with the logical merge module, wherein the logical merge module applies an algorithm, selected from among a plurality of algorithms, for implementing the determining by the element processing module and the adjusting by the state management module, the plurality of algorithms associated with varying respective levels of constraints associated with the plural input streams.

14. The logical merge module of claim 13, wherein the output stream is produced by selecting from at least one non-failed input stream to provide high availability.

15. A device comprising:
a processor; and
executable instructions operable by the processor, the executable instructions comprising a method for merging streams of data, the method comprising:
receiving a plurality of physically divergent input streams from respective sources;
identifying a plurality of elements in the plurality of input streams;
determining an output action to take in response to each identified element;
using a logical merge module to produce an output stream that is logically compatible with each of the input streams,
wherein the plurality of input streams include elements associated with at least element types of:
an insert element type which adds new output information to the output stream;
an adjust element type which adjusts previous output information in the output stream; and
a progress marker element type which defines a time prior to which no further modifications are permitted; and
adjusting a state associated with the logical merge module, wherein the logical merge module applies an algorithm selected from a plurality of algorithms for performing said adjusting and determining, the plurality of algorithms associated with varying respective levels of constraints associated with the plurality of input streams.

16. The device of claim 15, wherein one or more of the plurality of input streams include at least one of characteristics (a)-(c):
(a) temporally disordered stream elements;
(b) revisions made to prior stream elements; and
(c) missing stream elements.

17. The device of claim 15, wherein the method further comprises using the logical merge module to accelerate introduction of a new source which produces a new input stream.

18. The device of claim 15, wherein the output stream is produced by the logical merge module by selecting from at least one timely input stream to provide fast availability.

* * * * *